US009718573B1

(12) United States Patent
Hertz

(10) Patent No.: US 9,718,573 B1
(45) Date of Patent: Aug. 1, 2017

(54) CONTAINER HAVING CONVERTIBLE BASE

(71) Applicant: Allen D. Hertz, Boca Raton, FL (US)

(72) Inventor: Allen D. Hertz, Boca Raton, FL (US)

(*) Notice: Subject to any disclaimer, the term of this patent is extended or adjusted under 35 U.S.C. 154(b) by 0 days.

(21) Appl. No.: 15/346,724

(22) Filed: Nov. 8, 2016

Related U.S. Application Data

(63) Continuation-in-part of application No. 15/044,075, filed on Feb. 15, 2016, now Pat. No. 9,486,096, which is a continuation-in-part of application No. 14/672,220, filed on Mar. 29, 2015, now Pat. No. 9,260,221, which is a continuation-in-part of application No. 13/728,994, filed on Dec. 27, 2012, now Pat. No. 8,993,022.

(60) Provisional application No. 61/580,638, filed on Dec. 27, 2011.

(51) Int. Cl.
*B65D 1/40* (2006.01)
*A47J 47/14* (2006.01)
*A47G 19/32* (2006.01)
*B65D 21/02* (2006.01)
*B65D 51/28* (2006.01)

(52) U.S. Cl.
CPC ............ *B65D 1/40* (2013.01); *A47G 19/32* (2013.01); *A47J 47/14* (2013.01); *B65D 21/0223* (2013.01); *B65D 51/28* (2013.01)

(58) Field of Classification Search
CPC ...... B65D 1/40; B65D 51/28; B65D 21/0223; A47J 47/14; A47G 19/32
See application file for complete search history.

(56) References Cited

U.S. PATENT DOCUMENTS

| 2,121,165 | A | | 6/1938 | Slobodkin |
| 2,219,974 | A | | 10/1940 | Armstrong |
| 3,028,702 | A | | 4/1962 | St Cyr |
| 5,423,452 | A | | 6/1995 | Tardif |
| 5,626,256 | A | | 5/1997 | Onneweer |
| 5,722,558 | A | | 3/1998 | Thompson |
| D547,615 | S | * | 7/2007 | Wasserman ................... D7/542 |
| 8,448,801 | B2 | * | 5/2013 | Rusnak ............. B65D 43/0231 |
| | | | | 220/23.83 |
| 2005/0127074 | A1 | | 6/2005 | Kusuma et al. |
| 2006/0219725 | A1 | | 10/2006 | Ferro |

(Continued)

*Primary Examiner* — Erik Kashnikow
*Assistant Examiner* — Chaim Smith
(74) *Attorney, Agent, or Firm* — Allen D. Hertz, P.A.; Allen Hertz

(57) ABSTRACT

A convertible container assembly comprising a convertible container body. The container body includes angular series of conversion demarcations, defining an angular conversion section, and, optionally, at least one storage conversion demarcation, defining a storage conversion section. The angular conversion section includes a portion of a sidewall of the container body and a bottom portion of the container body. The angular conversion section toggles between an expanded configuration having a common horizontal upper rim and a compressed configuration creating a new container body support surface, angling the upper rim. The depth conversion section toggles between an expanded configuration as a container and a compressed configuration collapsing the container for storage. The conversion section can employ a single section or a series of sections, wherein the series of sections enable an accordion styled formation when collapsed.

20 Claims, 22 Drawing Sheets

(56) References Cited

U.S. PATENT DOCUMENTS

2007/0000922 A1 1/2007 Vovan et al.
2012/0210877 A1 8/2012 Bougdanos

* cited by examiner

CONTAINER HAVING CONVERTIBLE BASE

CROSS-REFERENCE TO RELATED APPLICATIONS

This Non-Provisional Utility Application is a Continuation-In-Part, claiming the benefit of:
co-pending U.S. Non-Provisional Utility application Ser. No. 15/044,075 filed on Feb. 15, 2016 (scheduled to issue as U.S. Pat. No. 9,486,096 on Nov. 8, 2016),
wherein, U.S. Non-Provisional Utility application Ser. No. 15/044,075 is a Continuation-In-Part, claiming the benefit of U.S. Non-Provisional Utility application Ser. No. 14/672,220 filed on Mar. 29, 2015 (issued as U.S. Pat. No. 9,260,221 on Feb. 16, 2016),
wherein, U.S. Non-Provisional Utility application Ser. No. 14/672,220 is a Continuation-In-Part, claiming the benefit of U.S. Non-Provisional Utility application Ser. No. 13/728,994 filed on Dec. 27, 2012 (issued as U.S. Pat. No. 8,993,022 on Mar. 31, 2015),
wherein, U.S. Non-Provisional Utility application Ser. No. 13/728,994 claims the benefit of co-pending U.S. Provisional Patent Application Ser. No. 61/580,638, filed on Dec. 27, 2011,
each of which are incorporated herein in their entireties.

FIELD OF THE INVENTION

The present invention relates to a carry out cuisine container and method of use, and more particularly, a carry out bowl having a convertible base, which enables a horizontally oriented configuration for transport and a non-horizontally oriented configuration for use during consumption of the contents therefrom.

BACKGROUND OF THE INVENTION

Carry out food containers are commonly designed having a base or support surface and an upper or access opening defined by a perimeter or upper rim of the container to which a cover can be removably affixed. The base surface is normally parallel with the perimeter. This feature aids in the attachment of a cover onto the upper rim of the bowl. The cover, when attached to the rim of the container additionally enables stacking of two or more containers within a carry out bag.

When the customer arrives at their destination, they typically remove the cover from the bowl and either transfer the contents into a different serving container or eat the contents directly from the carry out bowl. When eating the contents directly out of the carry out bowl, the upper rim of the container defining the opening through which the user accesses the food contained therein is horizontal.

Several cuisines are best consumed by being scooped out of the bowl. One example is a rice dish. The dining party commonly tilts the bowl and draws the edible contents from the bowl using chopsticks.

Meals, such as salads, are commonly served with a side volume of a condiment, such as salad dressing. Adding the condiment to the entrée just prior to consumption of the meal is desirous for certain cuisines. Placing salad dressing upon a salad a substantial time prior to consumption of the salad can cause the greens and other ingredients to loose their desired crisp texture over time. Currently, the condiment is stored in a condiment container and placed into the carry out bag. If multiple orders are placed within a single carry out bag, the consumer then needs to match the correct condiment with the associated carry out container. If the condiment and carry out containers are mismatched, the results could be detrimental to the consumer's dining experience.

Accordingly, there remains a need in the art for a carry out container that enables ease of packaging and transport, while also enhancing a dining experience.

SUMMARY OF THE INVENTION

The present invention overcomes the deficiencies of the known art and the problems that remain unsolved by providing a method and respective apparatus for packaging and consumption of take out appetizers, entrees, and desserts.

In accordance with one embodiment of the present invention, the invention consists of a carry out container comprising:
a convertible bowl comprising:
a concave shaped shell defining a content receiving section, the shell having a bottom portion defining a planar support surface, a bowl sidewall extending upwards from a peripheral edge of the bottom surface, and an upper rim circumscribing an upper edge of the bowl sidewall and an opening of the content receiving section, the upper rim defining a stacking plane, wherein the stacking plane and the support plane are substantially parallel to one another;
a conversion demarcation defining a conversion section, the conversion demarcation defining an angled bowl support surface encompassing a portion of the bottom portion and a portion of the bowl sidewall; and
a bowl cover comprising:
a cover section having a peripheral edge, and
a rim attachment feature formed about the peripheral edge, the rim attachment feature being shaped and shaped for removable attachment between the bowl cover and the convertible bowl to retain contents within the carry out container.

In a second aspect, the conversion demarcation is provided in a "C" shaped cross sectional geometry.

In another aspect, the conversion demarcation is provided in a partially "C" shaped cross sectional geometry.

In another aspect, the conversion demarcation is provided having a necked down configuration formed within a sidewall of the convertible bowl body.

In another aspect, the conversion demarcation is formed on an exterior surface of the convertible bowl.

In another aspect, the conversion demarcation is formed on an interior surface of the convertible bowl.

In another aspect, the conversion demarcation is formed on at least one of the exterior surface of the convertible bowl and the interior surface of the convertible bowl.

In another aspect, the apex of the conversion demarcation is oriented towards the content receiving section of the bowl.

In another aspect, the conversion demarcation encompasses a majority of the bottom portion.

In another aspect, the conversion section can include a series of demarcations formed to collapse the conversion section.

In another aspect, the conversion section can include a series of circular demarcations or fold lines to collapse the conversion section.

In another aspect, the convertible container comprises a plurality of angular conversion demarcations, each angular conversion demarcation of the series of angular conversion demarcations being a flexible formation that segments the convertible container body defining a depressible angular conversion section, an outermost angular conversion demarcation of the series of angular conversion demarcations substantially defining a plane angularly disposed from the bottom surface and encompassing a combined portion of the support surface and the container sidewall, one demarcation of the series of angular conversion demarcations is formed having a first cross sectional demarcation configuration and a different demarcation of the series of angular conversion demarcations is formed having a second cross sectional demarcation configuration, wherein the first cross sectional demarcation configuration and the second cross sectional demarcation configuration are different from one another.

In another aspect, the demarcations are formed as interior favored demarcations and exterior favored demarcations.

In another aspect, the interior favored demarcations and the exterior favored demarcations can be arranged in an alternating pattern.

In another aspect, the interior favored demarcations can be formed having material removed from an interior surface of the convertible container.

In another aspect, the interior favored demarcations would favor a fold forming an acute angle on an interior of the convertible container.

In another aspect, the exterior favored demarcations can be formed having material removed from an exterior surface of the convertible container.

In another aspect, the exterior favored demarcations would favor a fold forming an obtuse angle on the interior of the convertible container.

In another aspect, the first cross sectional demarcation configuration and the different demarcation can be formed having different thicknesses.

In another aspect, the depth of each demarcation can control a remaining thickness of the material of the convertible container in each respective demarcation. The greater the depth, the thinner the remaining material. The changes in thickness can be one feature used to control the order of the folding of the conversion segments. The thinner the demarcation, the quicker the demarcation reacts to the folding process.

In another aspect, the convertible container can be designed to cause the inner conversion segment to recess first, then each of the intermediary conversion segment, and ending with the folding of the outer conversion segment.

In another aspect, the convertible container can be designed to cause the outer conversion segment to recess first, then each of the intermediary conversion segment, and ending with the folding of the inner conversion segment.

In another aspect, the first cross sectional demarcation configuration and the different demarcation can be formed having different shapes.

In another aspect, the first cross sectional demarcation configuration and the different demarcation can be formed having a cross sectional shape in a form of a "V".

In another aspect, the first cross sectional demarcation configuration and the different demarcation can be formed having a cross sectional shape in a form of a "U". In another aspect, the conversion section can include a series of semicircular demarcations or fold lines to collapse the conversion section.

In another aspect, the conversion section can include a series of formed demarcations or fold lines to collapse the conversion section, wherein the formed demarcations define segments having a circular or annular plan shape, a semicircular plan shape, a "D" shaped plan shape, a triangular shape, a linear shape, a trapezoidal shape, a pentagonal shape, a hexagonal shape, an octagonal shape, and the like. The segments can include one or more of the various shapes to define a conversion section.

In another aspect, the conversion section can include a series of formed demarcations wherein the formed demarcations are off-centered from one another, to collapse the conversion section.

In another aspect, the conversion section can include a series of formed demarcations wherein the formed demarcations are concentric with one another, to collapse the conversion section.

In another aspect, the convertible container includes a second series of conversion sections defined by a series of demarcations, wherein the second series of conversion sections and associated series of demarcations are arranged generally parallel to at least one of a plane defined by the bowl upper opening rim and a plane defined by the container bottom portion.

In another aspect, the second series of conversion sections in conjunction with the associated series of demarcations enables a collapse of the bowl in an arrangement that is parallel to at least one of the plane defined by the bowl upper opening rim and the plane defined by the container bottom portion to reduce an overall height of the convertible bowl for storage.

In another aspect, the bowl cover further comprises a cover upper surface, wherein the upper surface provides a surface for supporting additional carry out containers.

In another aspect, the bowl cover further comprises a condiment container receptacle, the condiment container receptacle being provided in the cover upper surface.

In another aspect, the condiment container receptacle is contiguous with the cover, maintaining a seal for contents stored within the convertible bowl assembly.

In another aspect, the cover upper surface further comprises a recessed cover section, wherein a surface of the recessed cover section is positioned below a cover upper surface.

In another aspect, the bowl cover further comprises a condiment container receptacle, the condiment container receptacle being provided in the recessed cover section.

In another aspect, the convertible bowl assembly further comprises a condiment container assembly; the condiment container assembly comprises a condiment container and a condiment container cover.

In another aspect, the condiment container assembly comprises a container retention feature and the bowl cover further comprises a condiment container retention mating feature, wherein the condiment container retention feature engages with the container retention mating feature to retain the condiment container with the convertible bowl.

In another aspect, the condiment container retention feature is a recession formed at least partially circumscribing the condiment container and the container retention mating feature is a boss, which engages with the condiment container retention.

In another aspect, the condiment container retention feature is located to position the condiment container assembly enabling stacking of a second convertible bowl assembly upon the first convertible bowl assembly.

In another aspect, the convertible bowl assembly further comprising a recessed bottom surface to accommodate an attached condiment container assembly when stacked the convertible bowl assembly is placed upon a second convertible bowl assembly.

In another aspect, stacking of a first and a second convertible bowl assembly is enhanced by integrating a stacking base interface into the bowl bottom portion and a stacking cover interface into the cover upper surface.

In another aspect, the stacking base interface and mating stacking cover interface comprise a recess and a mating boss respectively.

In another aspect, the stacking base interface and mating stacking cover interface comprise a recessed cylindrical shape and a mating bossed cylindrical shape respectively.

In another aspect, the stacking base interface and mating stacking cover interface comprise a recessed vertically oriented tubular shape and a mating bossed vertically oriented tubular shape respectively.

In another aspect, the stacking base interface and mating stacking cover interface comprise a recessed ring and a mating bossed ring respectively.

Introducing another embodiment, a method of use includes the steps of:
  depositing an edible content into a convertible carry out container;
  sealing the convertible carry out container by attaching a bowl cover to the convertible carry out container;
  depressing a conversion section of the convertible carry out container inward to create a support surface which positions an upper edge of the convertible carry out container to a non-horizontal orientation;
  removing the bowl cover from the convertible carry out container;
  placing the convertible carry out container upon a support surface; and
  consuming the edible content from the edible content.

In another aspect, the method further comprises steps of:
  depositing a volume of a condiment into a condiment container assembly; and
  inserting the condiment container assembly into a condiment container receptacle forming within the bowl cover.

In another aspect, the method further comprises a step of:
  securing a second convertible bowl assembly onto an upper surface of a first convertible bowl assembly by securing a stacking cover interface and a stacking base interface together.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
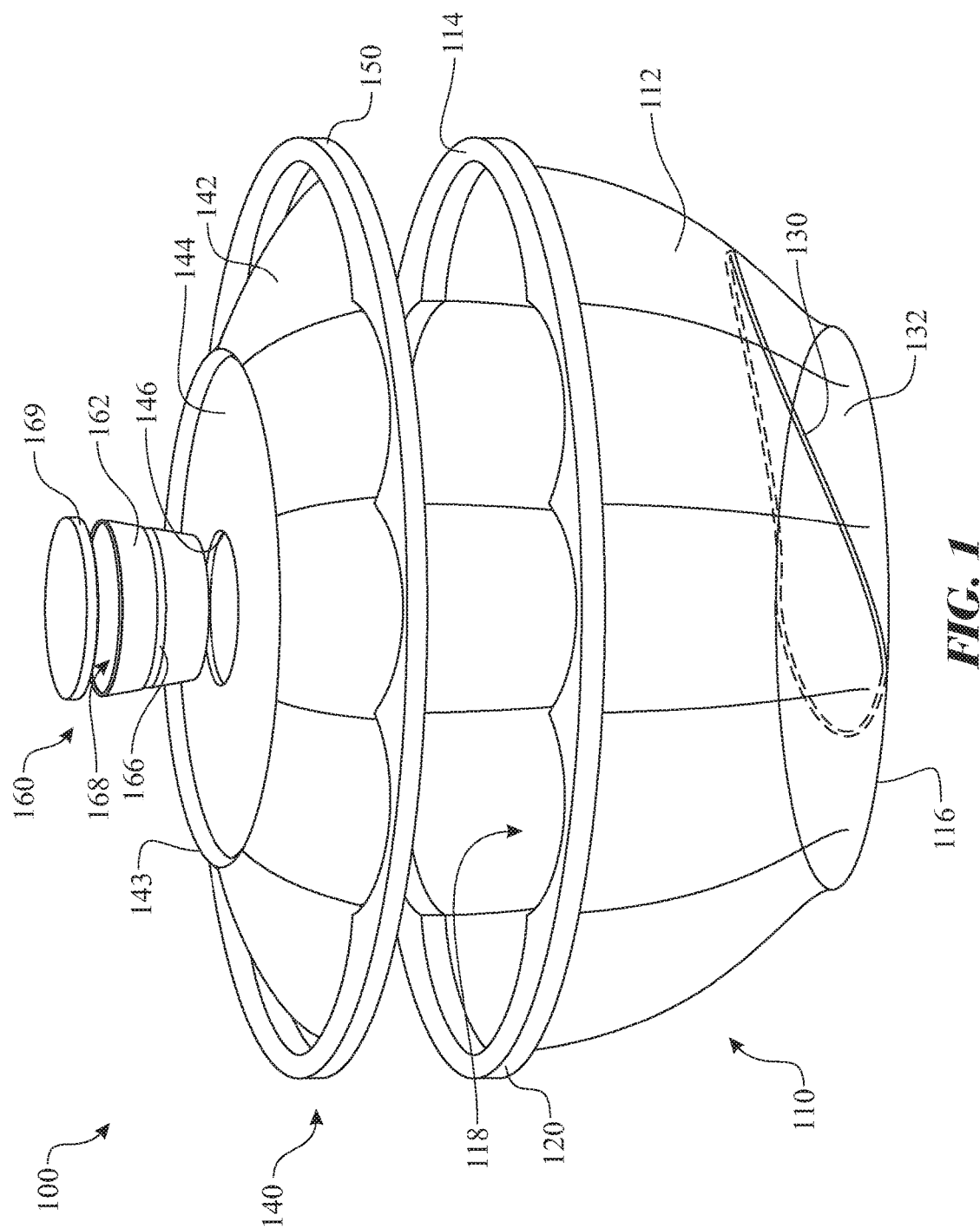
FIG. 1 presents an isometric, exploded assembly view of an exemplary convertible carry out bowl.
Figure 2:
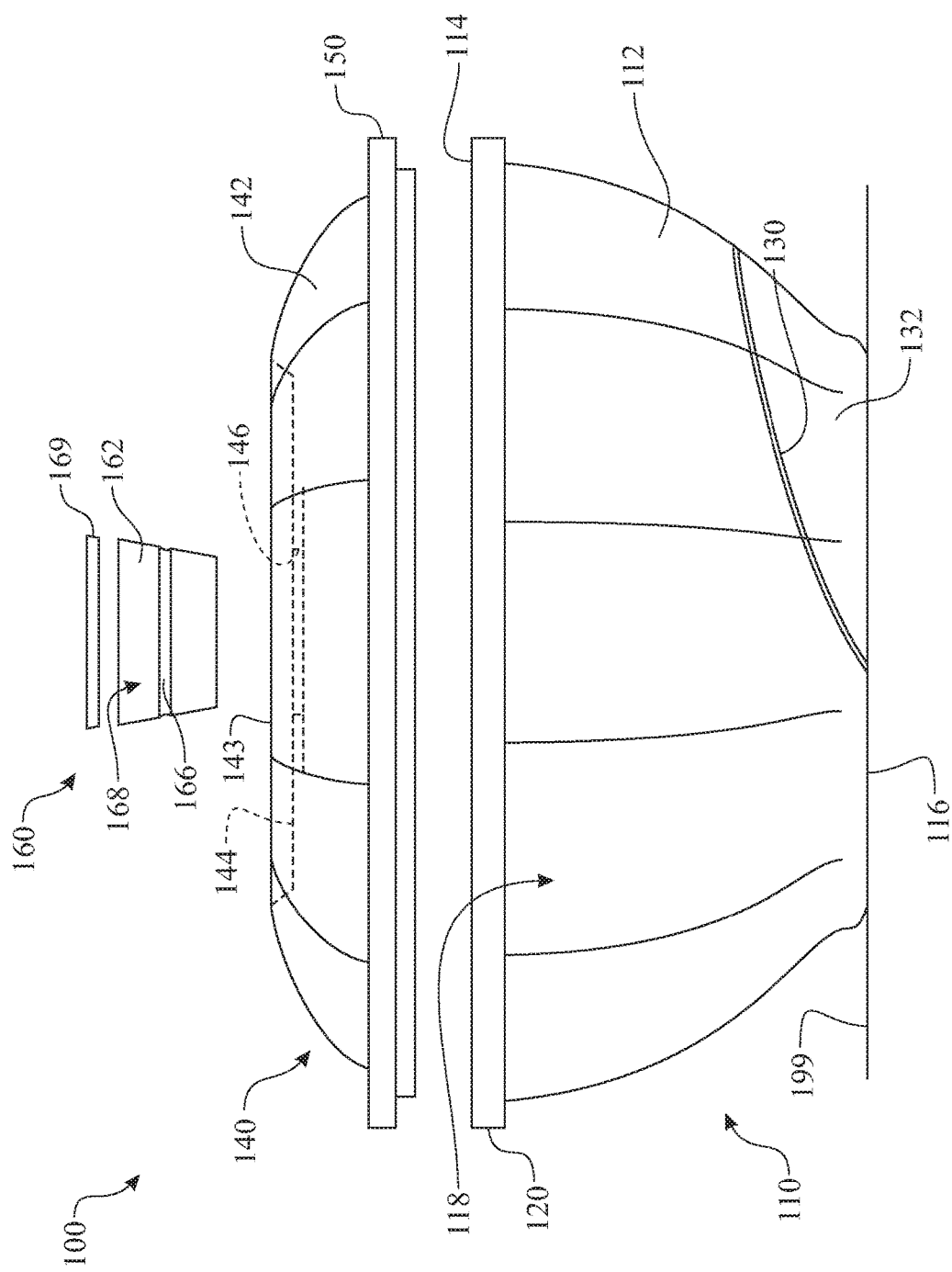
FIG. 2 presents a front, exploded assembly elevation view of the convertible carry out bowl originally introduced in FIG. 1, illustrated in a carry out configuration.
Figure 3:
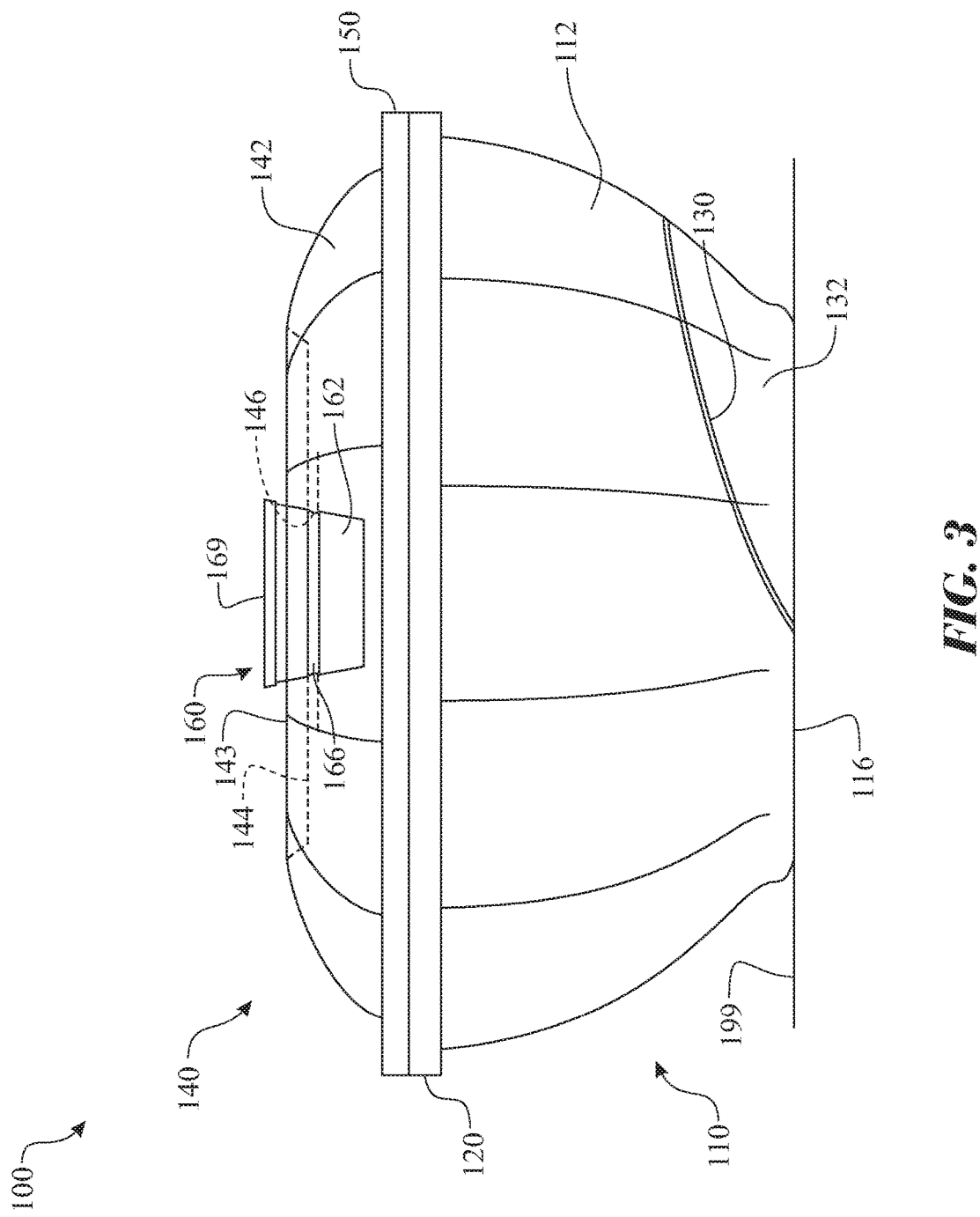
FIG. 3 presents a front, assembled elevation view of the convertible carry out bowl originally introduced in FIG. 1, illustrated in a carry out configuration.
Figure 4:
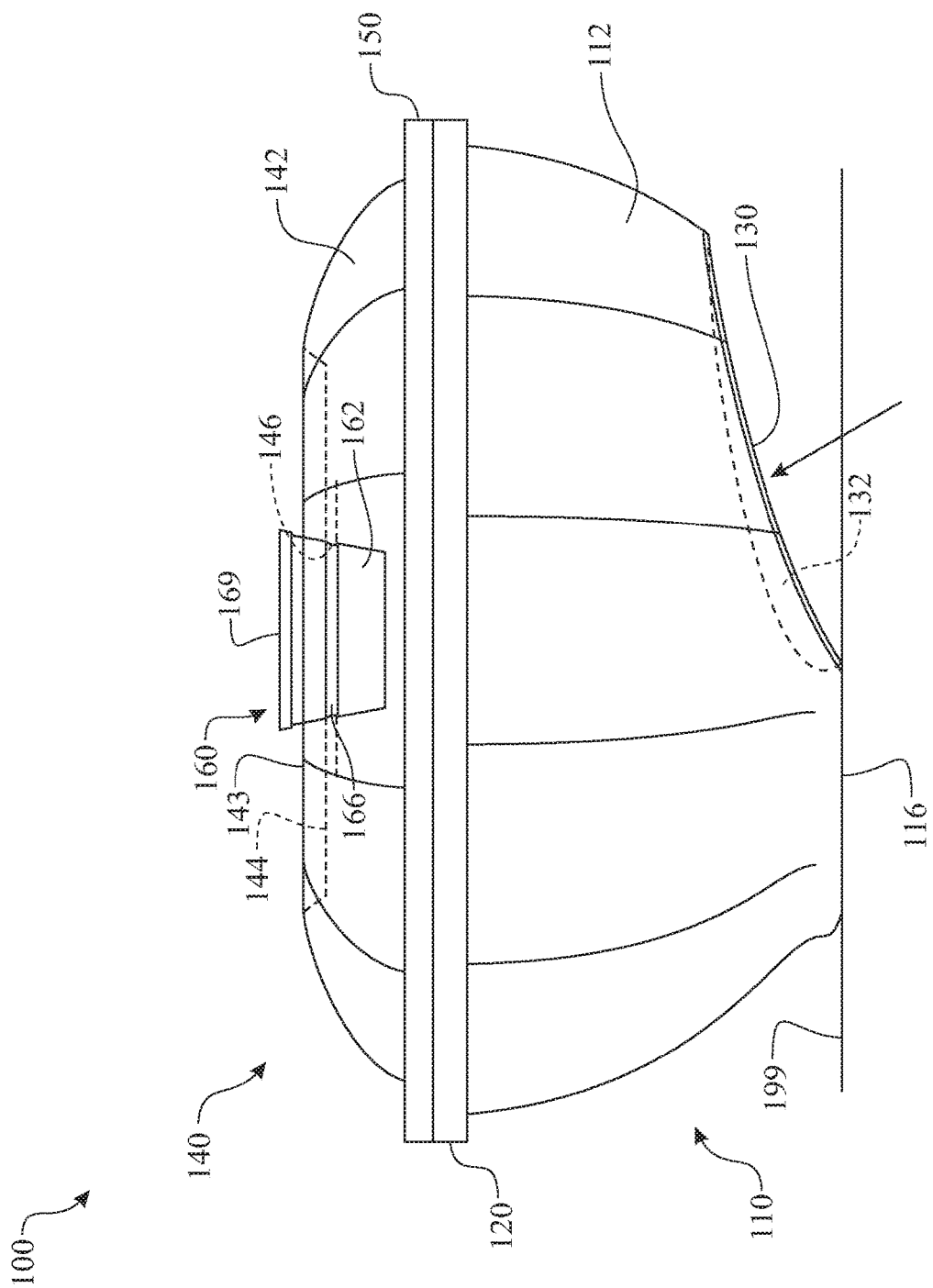
FIG. 4 presents a front, assembled elevation view of the convertible carry out bowl originally introduced in FIG. 1, illustrated in an initial conversion step of being transformed into a tilted configuration, for employment during consumption of edible contents stored therein.
Figure 5:
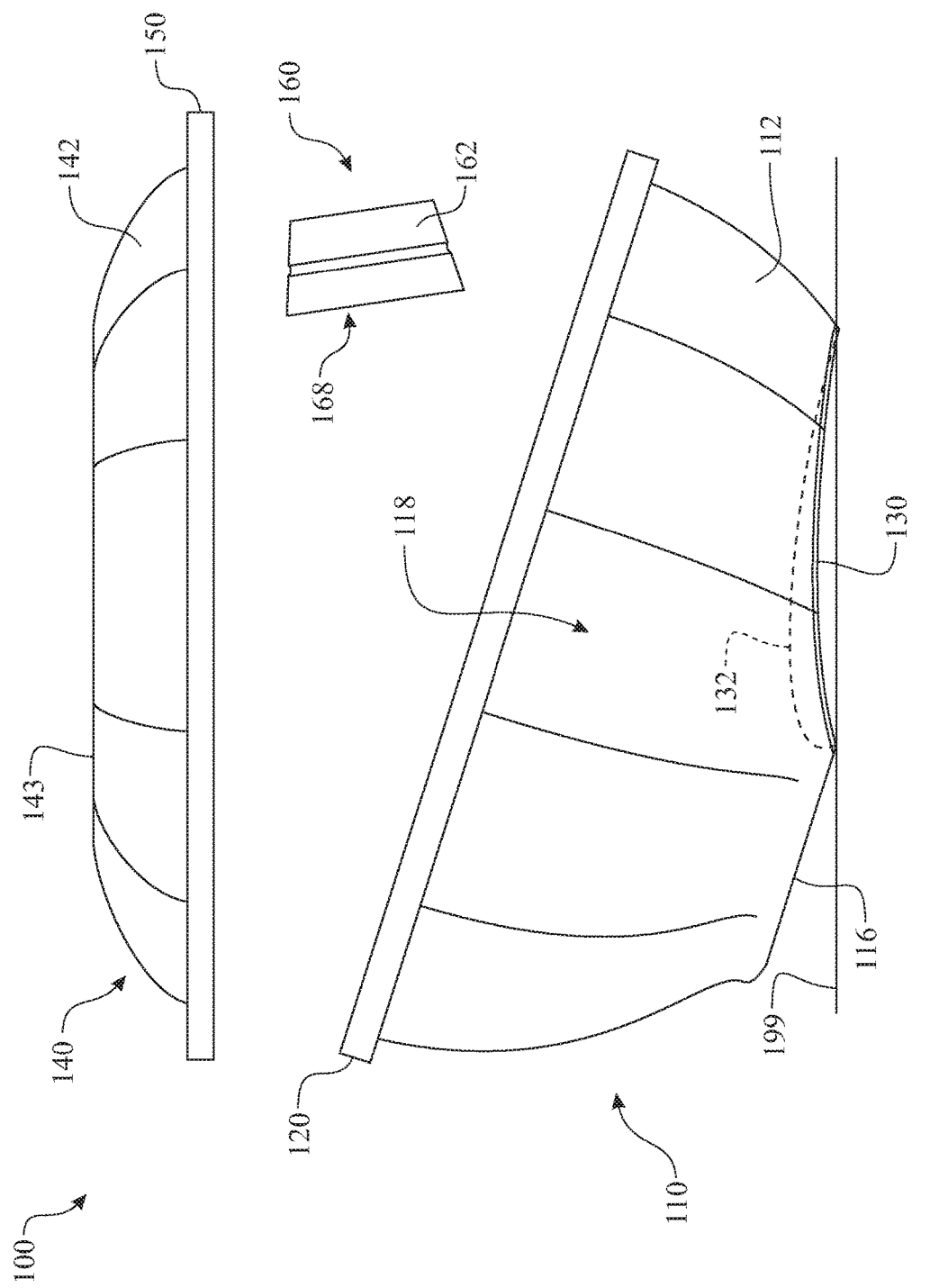
FIG. 5 presents a front, assembled elevation view of the convertible carry out bowl as converted in FIG. 4, illustrating the tilted configuration and positioned for employment during consumption of the edible contents stored therein.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A convertible bowl assembly 100 is presented in various configurations in the illustrations of FIGS. 1 through 7. The convertible bowl assembly 100 includes a convertible bowl 110 and a bowl cover 140. The convertible bowl assembly 100 can be further enhanced by optionally integrating a condiment container receptacle 148 into the bowl cover 140 for receiving and retaining a condiment container assembly 160.

The convertible bowl 110 comprises a concave shaped shell sidewall 112 extending upward from a peripheral edge of a bowl bottom portion 116 and terminating at an upper opening rim 114. An interior portion of the concave shaped shell sidewall 112 and bowl bottom portion 116 collectively define a bowl content receiving section 118 for storage of edible contents. A conversion demarcation 130 is formed within the convertible bowl 110 wherein the conversion demarcation 130 encompasses a portion of the concave shaped shell sidewall 112 and a portion of the bowl bottom portion 116. The conversion demarcation 130 defines a conversion section 132. It is preferred that the conversion section 132 includes a majority of the bowl bottom portion 116. The conversion demarcation 130 can be a "C" shaped formation, a necked down configuration, or other shape to clearly identify a transition edge. The concave shaped shell sidewall 112 can include optional shaping such as scalloping to enhance the rigidity thereof, the aesthetics, and the like. The conversion demarcation 130 can extend inward from at least one of an interior surface of the body of the convertible bowl 110 and an exterior surface of the body of the convertible bowl 110. The bowl bottom portion 116 defines a support surface when the convertible bowl assembly 100 is in a transport configuration. During transport, the bowl bottom portion 116 rests upon a support surface 199.

Figure 6:
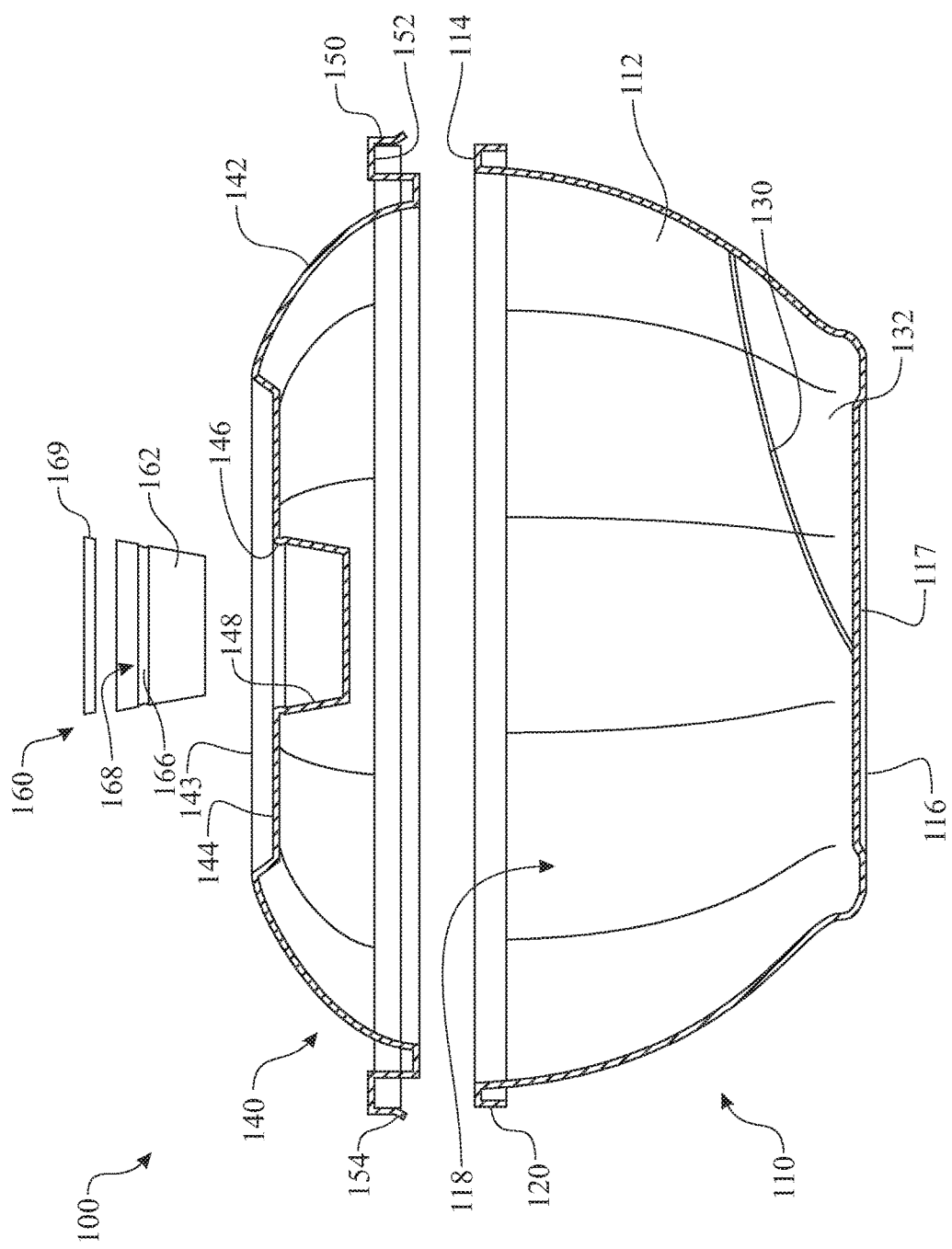
FIG. 6 presents a sectioned exploded assembly side view of the exemplary convertible carry out bowl originally introduced in FIG. 1.
Figure 7:
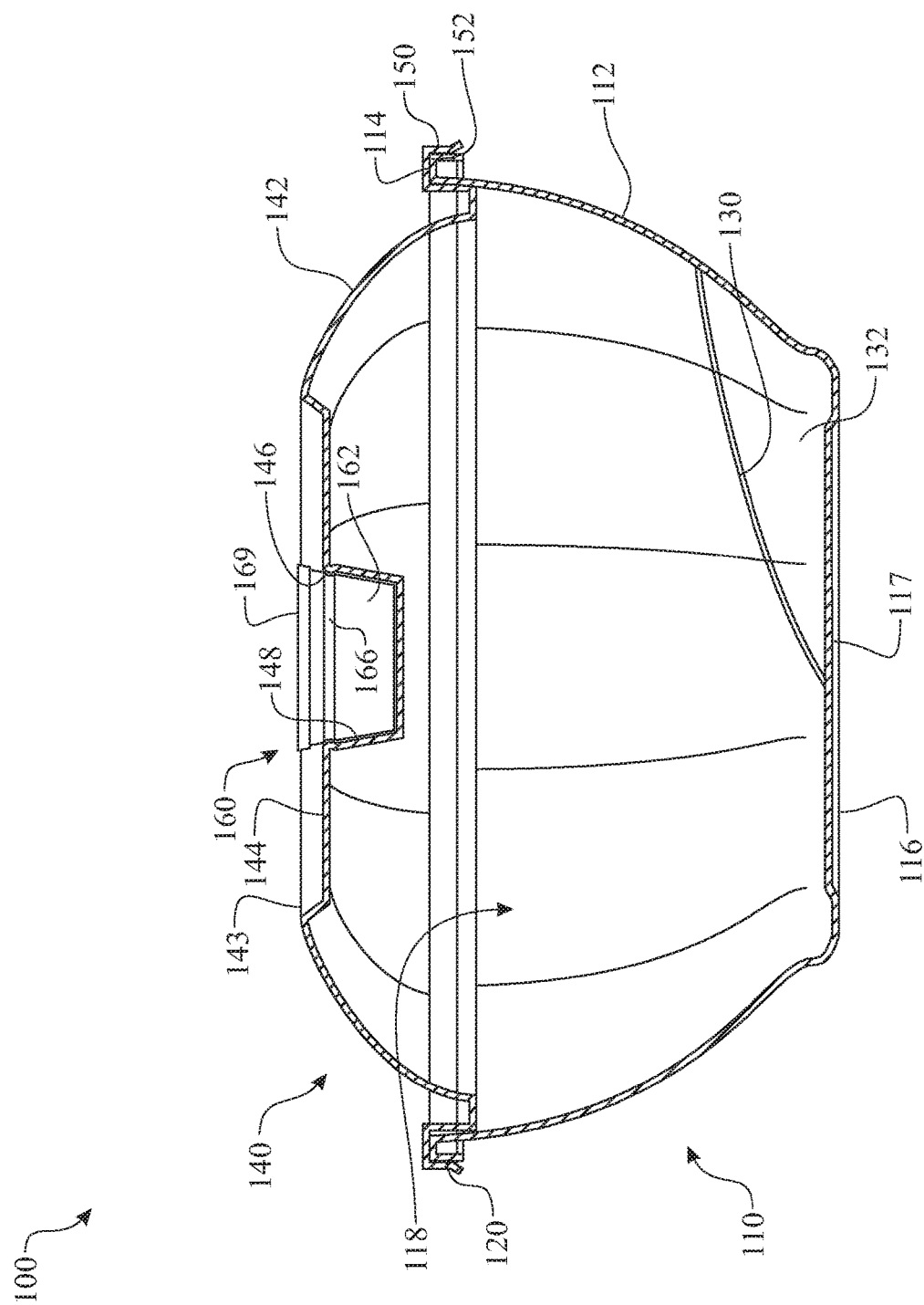
FIG. 7 presents a sectioned assembled side view of the exemplary convertible carry out bowl as previously presented in FIG. 6 with the cover engaged with the bowl rim.

A cover attachment interface 120 is formed about the upper opening rim 114 for receiving the bowl cover 140 as best shown in the cross sectioned illustrations of FIGS. 6 and 7. The cover attachment interface 120 can be formed in any configuration, wherein the exemplary shape is an inverted "U". It is understood that the cover attachment interface 120 can be formed in the shape of a bead, an "L", and the like. The exemplary cover attachment interface 120 is shaped external to the bowl content receiving section 118, as the preferred configuration is easily fabricated using a vacuum forming process.

The bowl cover 140 comprises a cover section 142 extending across an interior defined by a rim attachment feature 150 as best shown in the cross sectioned illustrations of FIGS. 6 and 7. It is preferred that the cover section 142 extends upward forming a concave interior space. A cover upper surface 143 can be integrated into the shape of an upper portion of the curved cover section 142. The cover upper surface 143 defines a planar upper support surface for supporting objects stacked upon the bowl cover 140. The rim attachment feature 150 is shaped to include a rim receiving interface 152. The rim receiving interface 152 is sized and shaped to engage with the cover attachment interface 120. The bowl cover 140 is preferably fabricated using a vacuum forming process and designed to be slightly flexible, enabling releasable engagement between the cover attachment interface 120 and the rim receiving interface 152. A removal assisting lip 154 can extend outward from a lower edge of the rim receiving interface 152 to aid the user in removing the bowl cover 140 from the convertible bowl 110. The removal assisting lip 154 can be provided as a short tab extending from a portion of the peripheral edge of the rim receiving interface 152 or be contiguous about the entire peripheral edge of the rim receiving interface 152.

In use, the convertible bowl 110 is configured with the conversion section 132 extending outward placing the convertible bowl 110 into a portable configuration. The portable configuration orients the upper opening rim 114 horizontally, enabling placement of items onto a top surface of the convertible bowl assembly 100 in a substantially vertical orientation during transport from the restaurant to the dining location. The convertible bowl 110 is converted into a serving container by depressing the conversion section 132 inward towards the bowl content receiving section 118. The concave shaped shell sidewall 112 deforms along the conversion demarcation 130 forming a serving support surface. When served, the conversion demarcation 130 is placed upon the support surface 199. The serving support surface defined by the conversion demarcation 130 supports the convertible bowl 110, placing the upper opening rim 114 at an angle from horizontal. The convertible bowl 110 is rotationally oriented placing the lowest portion of upper opening rim 114 closest to the user. The conversion section 132 may include pleats or other features to aid in collapsing the projected section of the bowl when undergoing the conversion process.

A condiment container assembly 160 can be included with the convertible bowl assembly 100 for storage and delivery of condiments or other additives for application upon or mixing with the stored consumable. The condiment container assembly 160 comprises a condiment container 162 and a condiment container cover 169. The condiment container 162 defines a condiment container contents receptacle 168 for receiving and storing contents therein. The condiment container cover 169 attaches to an upper edge of the condiment container 162 to seal a volume or quantity of the condiments within the condiment container contents receptacle 168. The condiment container 162 and condiment container cover 169 can be provided in any compatible shape.

A condiment container receptacle 148 can optionally be integrated into the upper surface of the bowl cover 140 for receiving and retaining the condiment container assembly 160. In the exemplary embodiment, the cover upper surface 143 further comprises a recessed cover section 144. The recessed cover section 144 is provided to accommodate a portion of the condiment container assembly 160 extending above the surface of the recessed cover section 144. The condiment container receptacle 148 extends downward from the recessed cover section 144. Both, the condiment container receptacle 148 and a sidewall of the condiment container 162 are preferably shaped as an inverted frustum to optimize fabrication as well as fit therebetween.

The condiment container assembly 160 can be retained within the condiment container receptacle 148 by including a retention interface therebetween. In the exemplary embodiment, a condiment container retention feature 166 can be integrated into the condiment container 162 and a container retention mating feature 146 can be integrated into the condiment container receptacle 148. The container retention mating feature 146 can be a ring, a boss, a series of bosses, and the like projecting towards a center of the condiment container receptacle 148. The condiment container retention feature 166 can be a recession formed about a circumference of the condiment container 162. When the condiment container assembly 160 is inserted into the condiment container receptacle 148, the container retention mating feature 146 engages with the condiment container retention feature 166 to retain the condiment container assembly 160 within the condiment container receptacle 148.

A bottom recession 117 can be included within the bowl bottom portion 116, wherein the bottom recession 117 provides sufficient space for the portion of the condiment container assembly 160 extending above the surface of the recessed cover section 144, when a first convertible bowl 110 is placed upon a second convertible bowl assembly 100.

Figure 8:
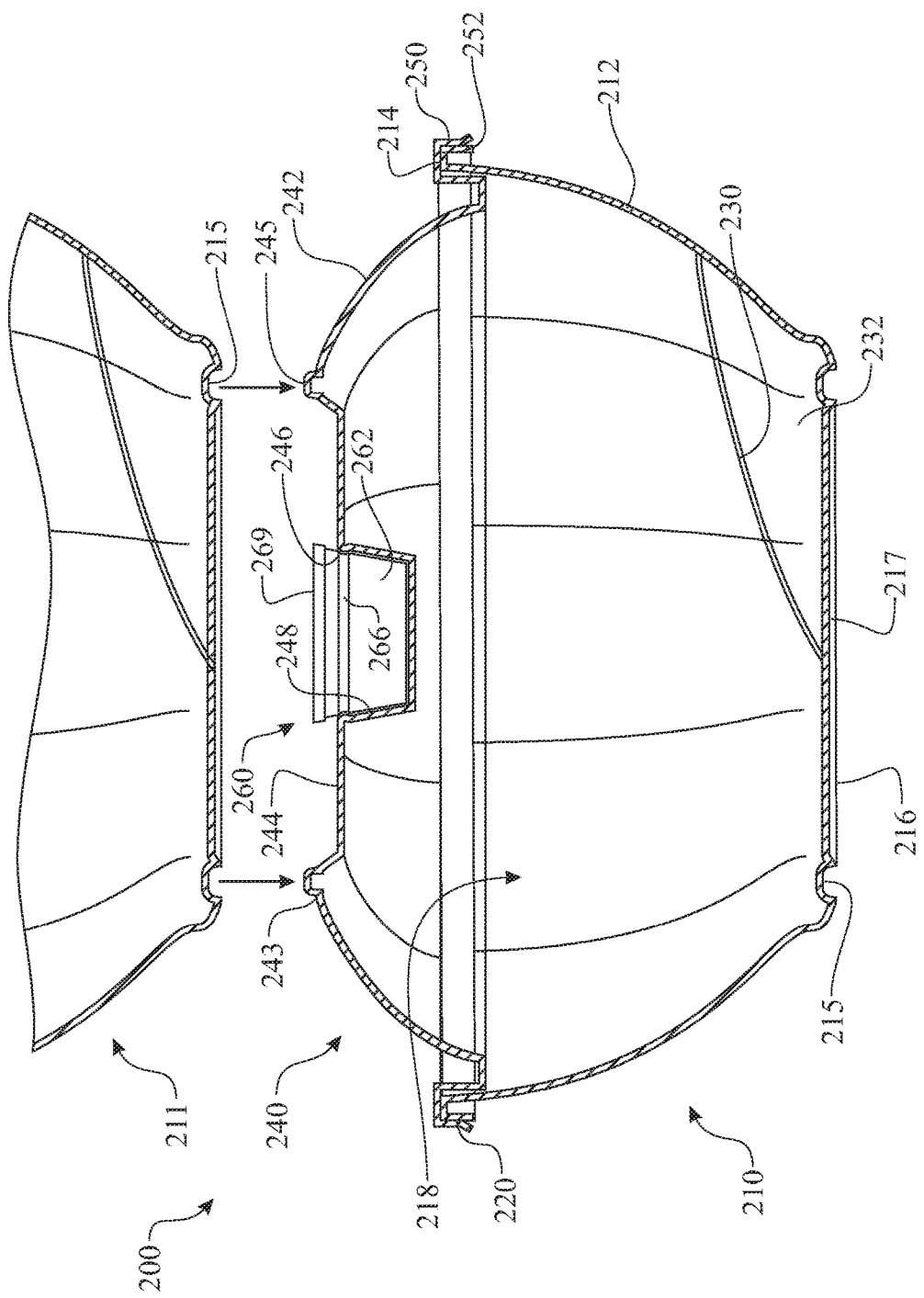
FIG. 8 presents an enhanced version of the convertible carry out bowl introducing an exemplary stacking interface feature, the illustration presenting a pair of stacked bowls in an exploded assembly view.
Figure 9:
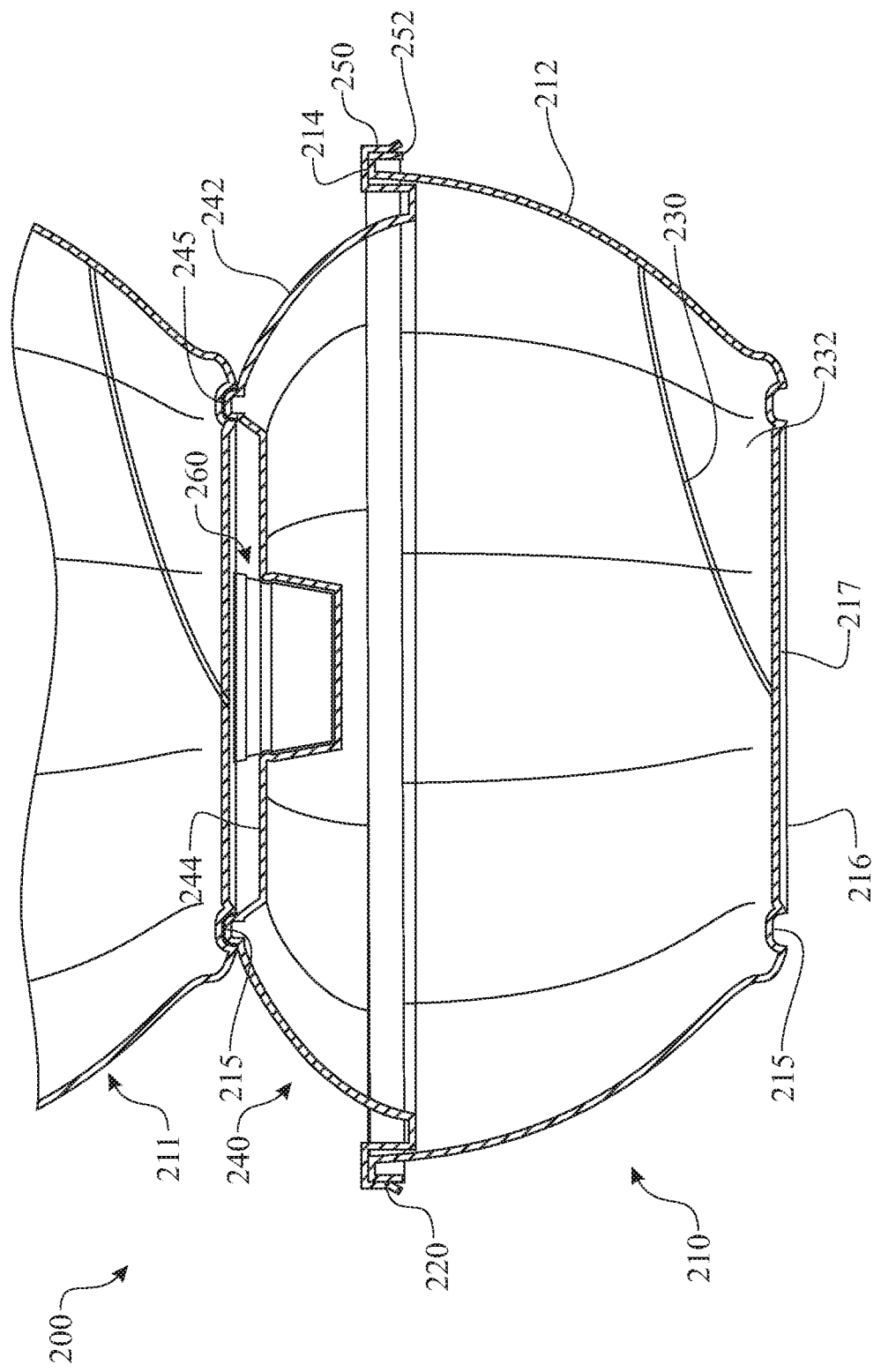
FIG. 9 presents the convertible carry out bowl of FIG. 8, illustrating a pair of bowls in stacked configuration.

An enhanced embodiment of the convertible bowl assembly 100 is presented as a convertible bowl assembly 200 and illustrated in FIGS. 8 and 9. Like features of the convertible bowl assembly 200 and convertible bowl assembly 100 are numbered the same except preceded by the numeral '2'. The convertible bowl assembly 200 includes an interface for aiding and retaining two or more convertible bowl assemblies 200 in a stacked configuration. The exemplary stacking interface includes a stacking base interface 215 shaped in a bowl bottom portion 216 of a convertible bowl 210 and a stacking cover interface 245 shaped into a cover upper surface 243 of a bowl cover 240. The stacking base interface 215 and stacking cover interface 245 can be of any reasonable shape, size, and location to releasably mate together as desired. The stacking base interface 215 and stacking cover interface 245 can be provided in a recessed cylindrical shape and a mating bossed cylindrical shape respectively. The stacking base interface 215 and stacking cover interface 245 can alternately be provided in a recessed vertically oriented tubular shape and a mating bossed vertically oriented tubular shape respectively. In yet another option, the stacking base interface 215 and stacking cover interface 245 can be provided in a recessed ring and a mating bossed ring respectively.

In use, the serving party places edible contents into a bowl content receiving section 218 of the convertible bowl 210. A bowl cover 240 is removably attached to the convertible bowl 210 by engaging a rim receiving interface 252 of the bowl cover 240 with a cover attachment interface 220 of the convertible bowl 210, sealing the contents within the interior volume. Condiments or other additives are placed within an interior of a condiment container 262. The contents are sealed therein by attaching a condiment container cover 269 to an upper edge of the condiment container 262. A condiment container retention feature 266 is formed about a circumference of the condiment container 262. The condiment container retention feature 266 engages with a container retention mating feature 246 formed within a condiment container receptacle 248 of the bowl cover 240. The serving party inserts the condiment container assembly 260 into the condiment container retention feature 266 until the container retention mating feature 246 engages with the condiment container receptacle 248. The engagement between the condiment container retention feature 266 and the condiment container receptacle 248 retains the condiment container assembly 260 within the condiment container receptacle 248. This retains the condiment with the associated edible contents within the respective convertible bowl 210. The process is repeated with a second convertible bowl assembly 200. The second convertible bowl assembly 200 is attached to a bowl cover 240 of a first convertible bowl assembly 200 by engaging the stacking base interface 215 of the second convertible bowl 210 with the stacking cover interface 245 of the first bowl cover 240.

The convertible bowl assembly 100, 200 provides several advantages over the current art. The conversion demarcation 130, 230 enables the user to depress the conversion section 132, 232 to create an angled support surface, wherein the angled support surface tilts the upper opening rim 114, 214. The tilted upper opening rim 114, 214 improves the process of consuming the contents of the convertible bowl 110, 210. Currently condiment containers are placed within a carry out bag without any association with any of the convertible bowls 110, 210. The inclusion of the condiment container receptacle 148, 248 provides an interface for associating the respective condiment container assembly 160, 260 with the contents of the convertible bowl 110, 210. Stacking of a plurality of convertible bowl assemblies 100 can cause undesirable shifting of the convertible bowl assemblies 100 during transport. The convertible bowl assembly 200 provides an additional advantage where a bowl bottom portion 216 of a first convertible bowl assembly 200 is attached to a cover upper surface 243 of a second convertible bowl assembly 200. This eliminates any undesirable shifting during transport.

Figure 10:
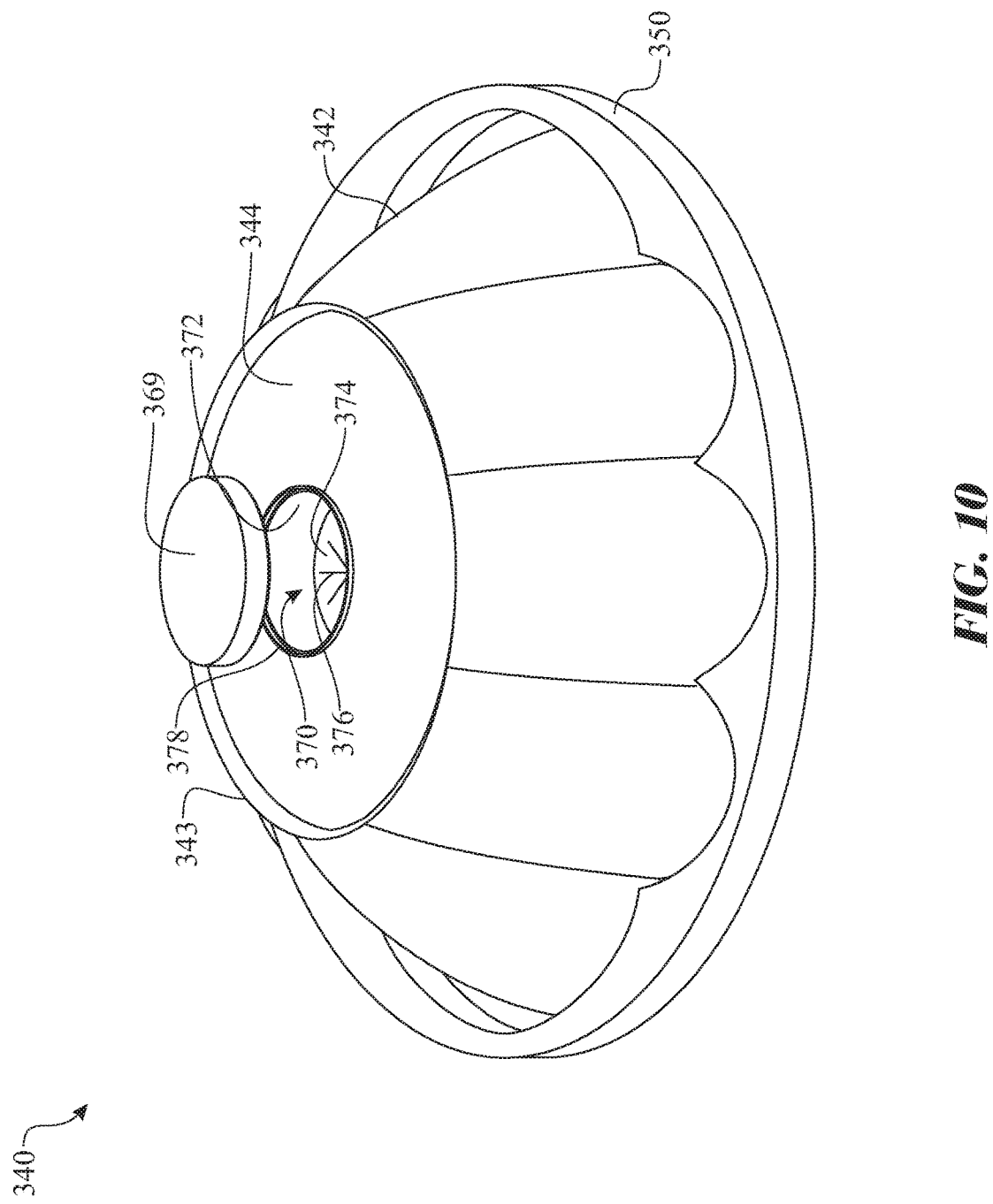
FIG. 10 presents an isometric view of a lid comprising an alternative integrated dressing storage and serving configuration.
Figure 11:
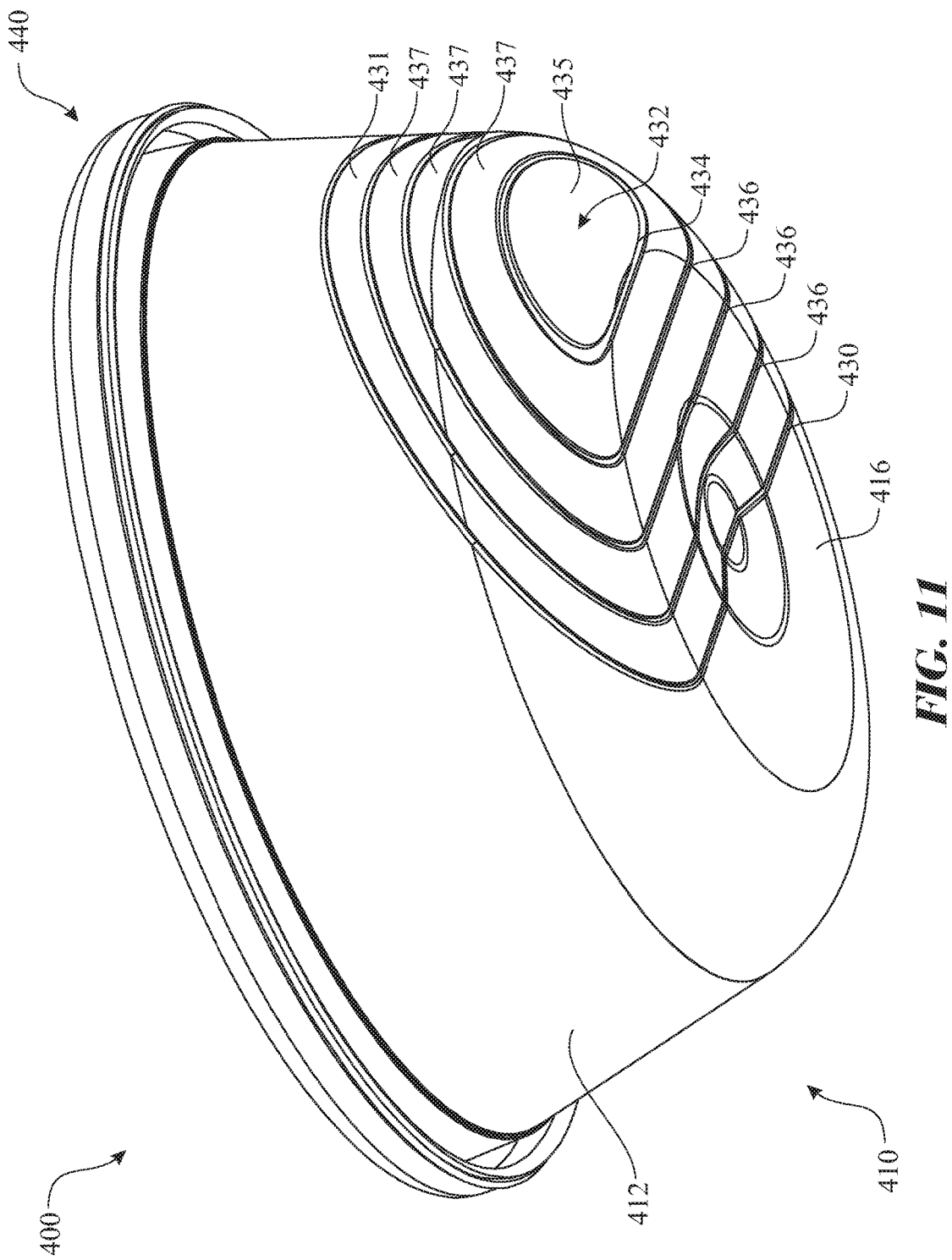
FIG. 11 presents an isometric view of another enhanced version of the convertible carry out bowl, wherein the enhancement introduces an accordion expansion and collapsing design.
Figure 12:
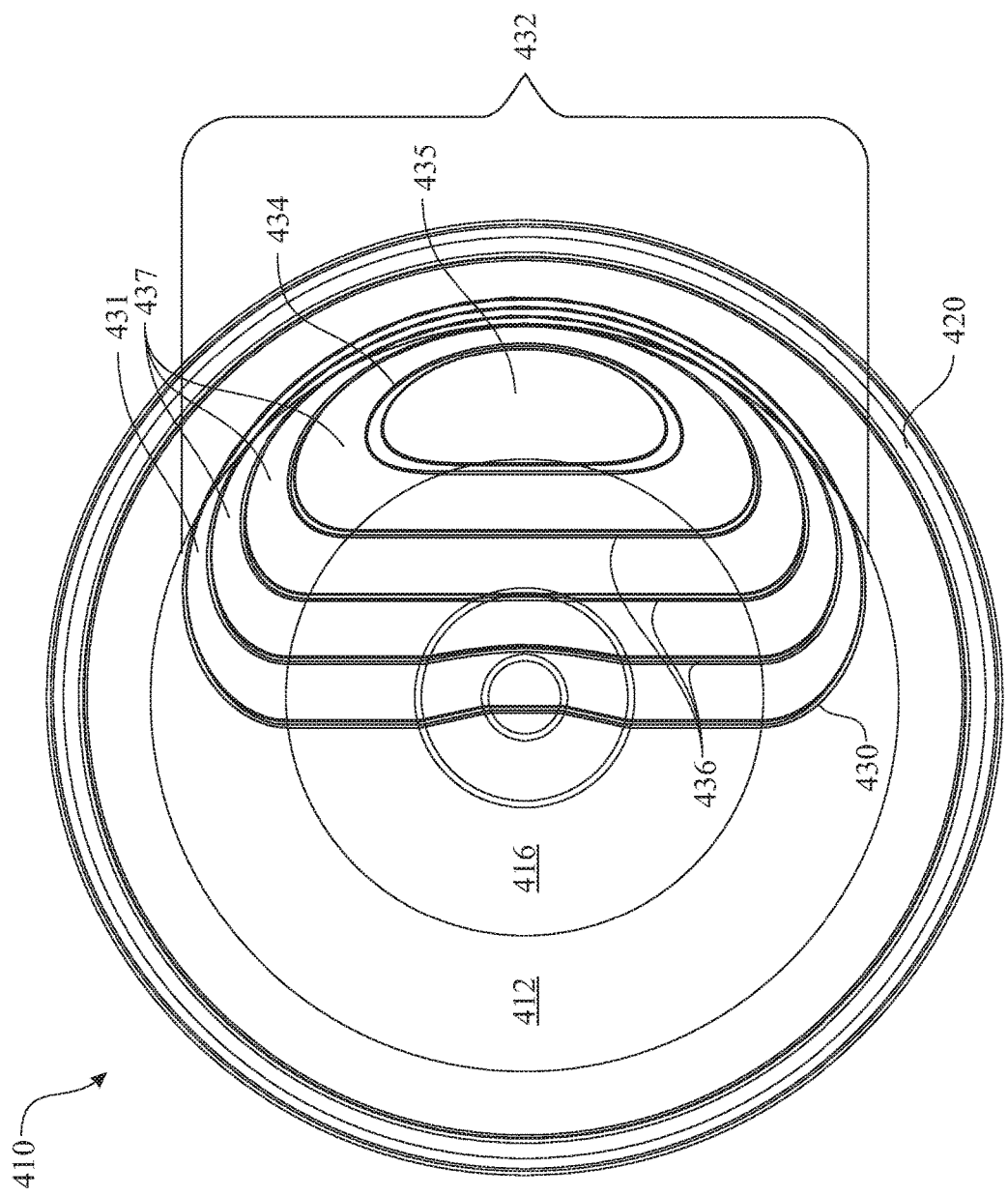
FIG. 12 presents a bottom plan view of the enhanced version of the convertible carry out bowl originally introduced in FIG. 11, wherein the illustration presents a bottom view describing the accordion expansion and collapsing design.
Figure 13:
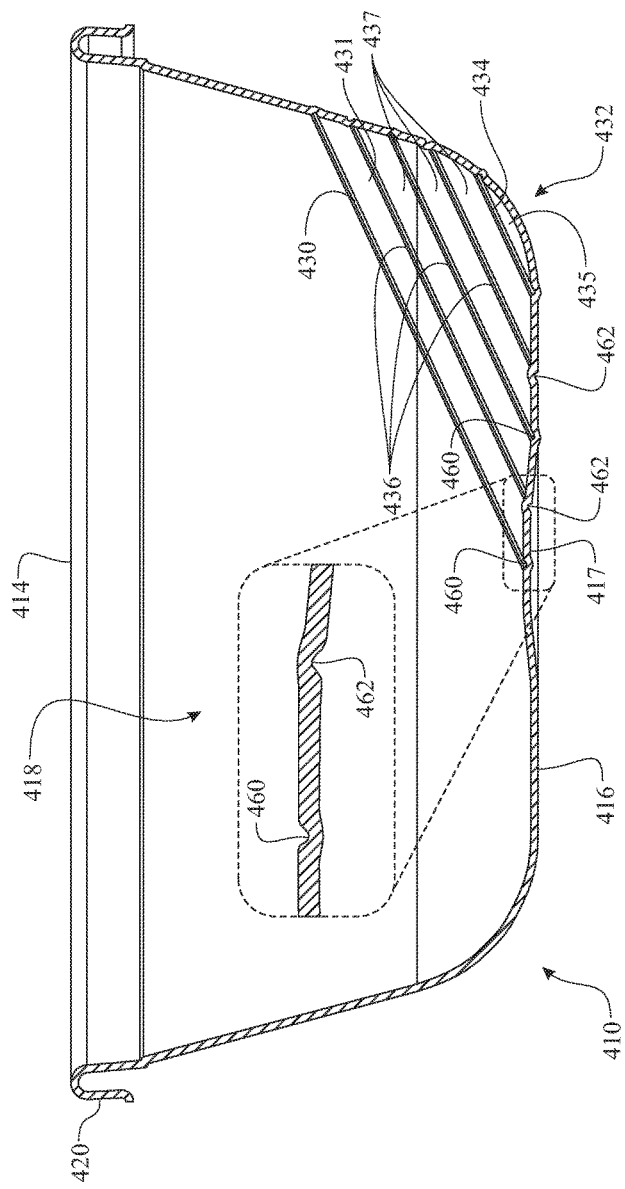
FIG. 13 presents a side elevation view of the enhanced version of the convertible carry out bowl originally introduced in FIG. 11, wherein the illustration presents a side elevation view describing the accordion expansion and collapsing design.

A bowl cover 340 integrates a condiment container 370 therein, as illustrated in FIG. 10. The bowl cover 340 is similar to the bowl cover 240, with the introduction of the condiment container 370. Like features of the bowl cover 340 and bowl cover 240 are numbered the same except preceded by the numeral '3'. The condiment container 370 is formed within the upper cover section 344 of the bowl cover 340. The condiment container 370 includes a condiment sidewall 372 extending downward from a peripheral edge of the condiment container 370 formed within the upper cover section 344, and terminating at a condiment container base 374. Condiments, such as salad dressing, ketchup, mustard, tarter sauce, and the like, are dispensed into the condiment container 370. A condiment container cover 369 is secured to the lid coupling rim 378, retaining the condiment within the condiment container 370 until use. A plurality of dispensing grooves 376 is formed in the condiment container base 374. The dispensing grooves 376 enables the user to fracture the condiment container base 374 by applying a compression force onto the condiment container base 374, causing the dispensing grooves 376 to separate. In one method, the user can apply a force using a knife or other kitchen utensil. The fractured dispensing grooves 376 enable the dressing to pass through the condiment container base 374 onto the contents of the bowl. The user can then re-secure the condiment container cover 369 to the lid coupling rim 378 and shake the contents within the bowl to mix the dressing therewith.

Figure 14:
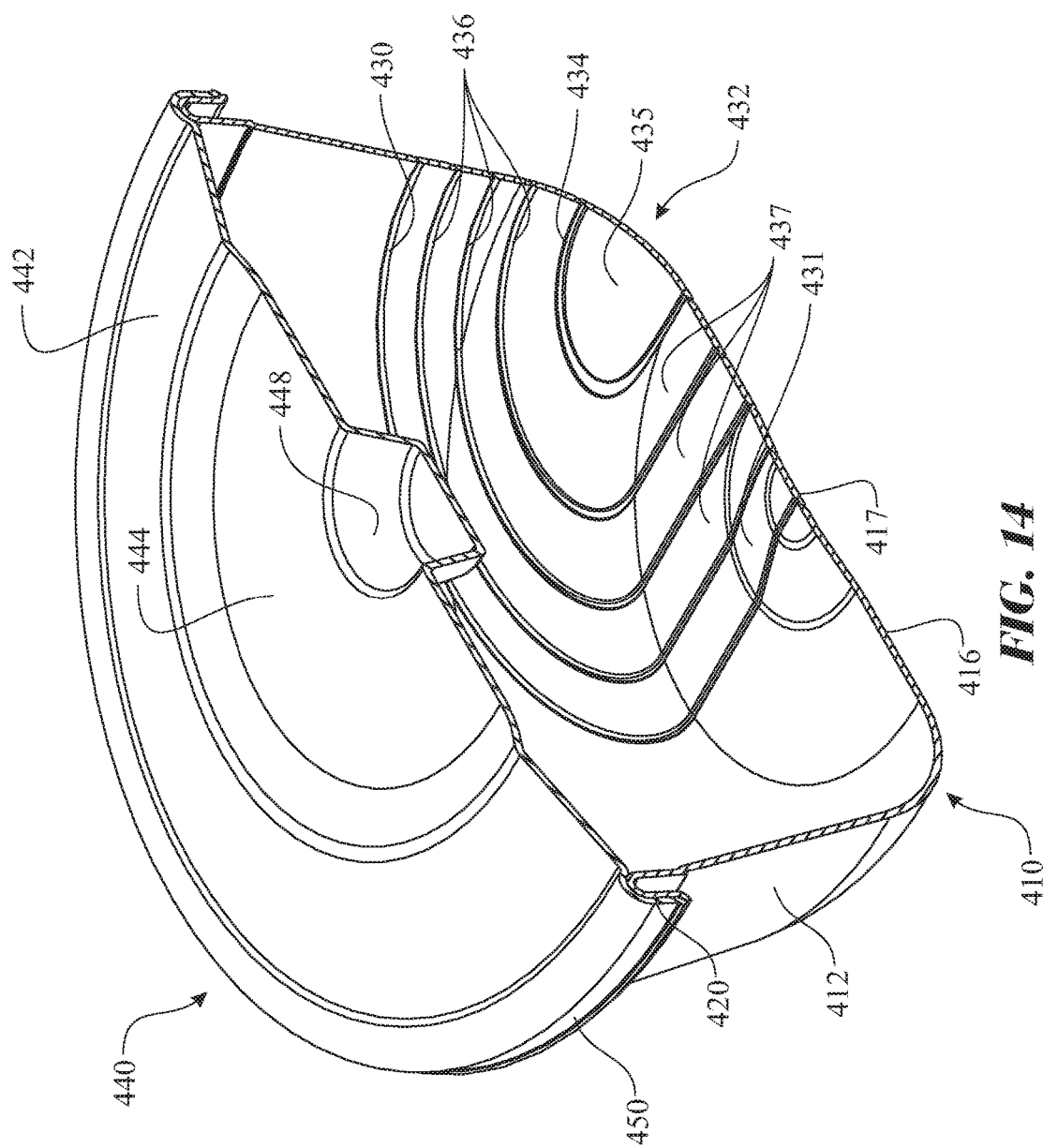
FIG. 14 presents a sectioned isometric side view of the enhanced version of the convertible carry out bowl originally introduced in FIG. 11, wherein the illustration presents the convertible carry out bowl in an expanded, carry out configuration.
Figure 15:
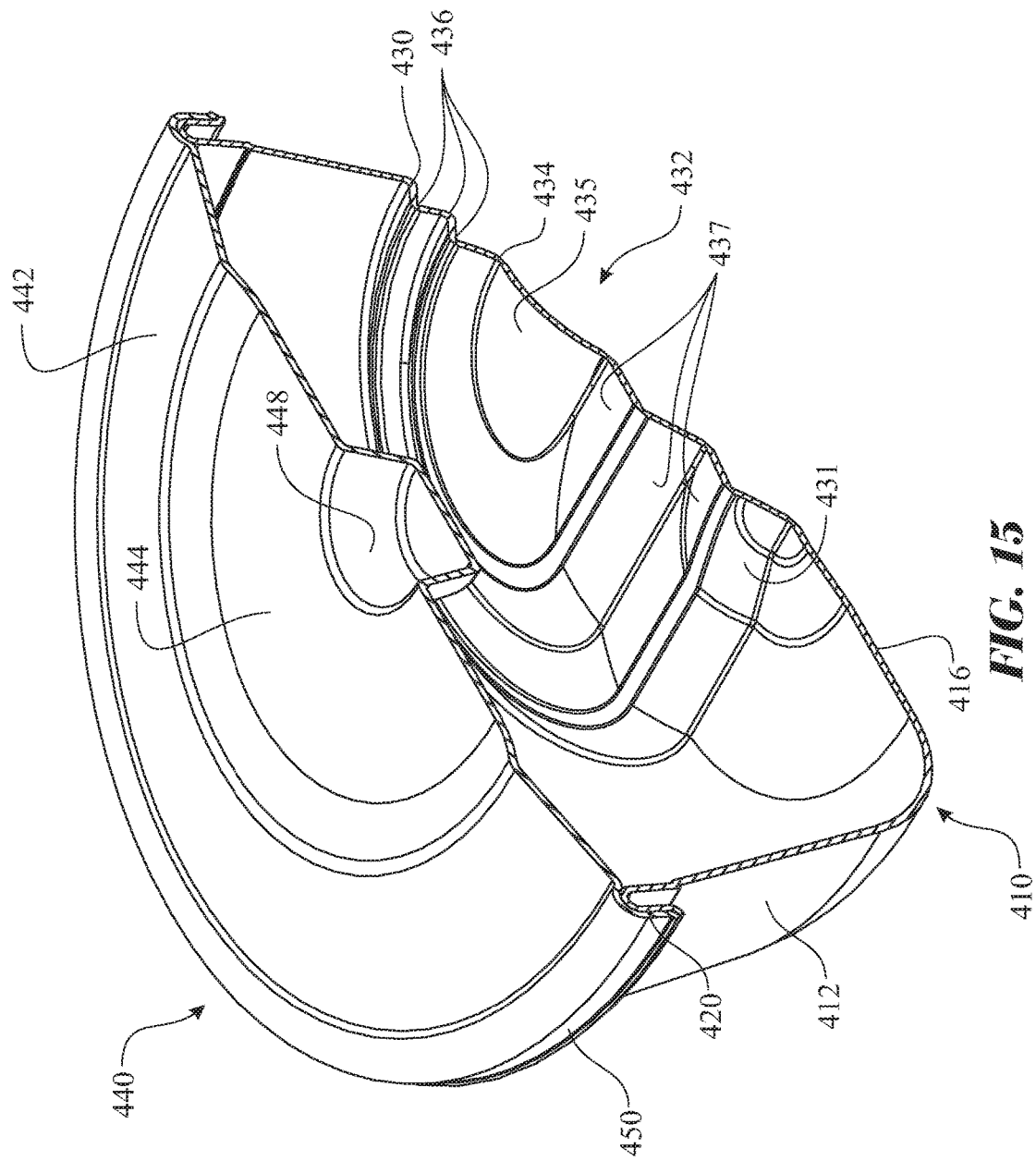
FIG. 15 presents a sectioned isometric side view of the enhanced version of the convertible carry out bowl originally introduced in FIG. 11, wherein the illustration presents the convertible carry out bowl in a collapsed, serving configuration prior to removal of the container lid.
Figure 16:
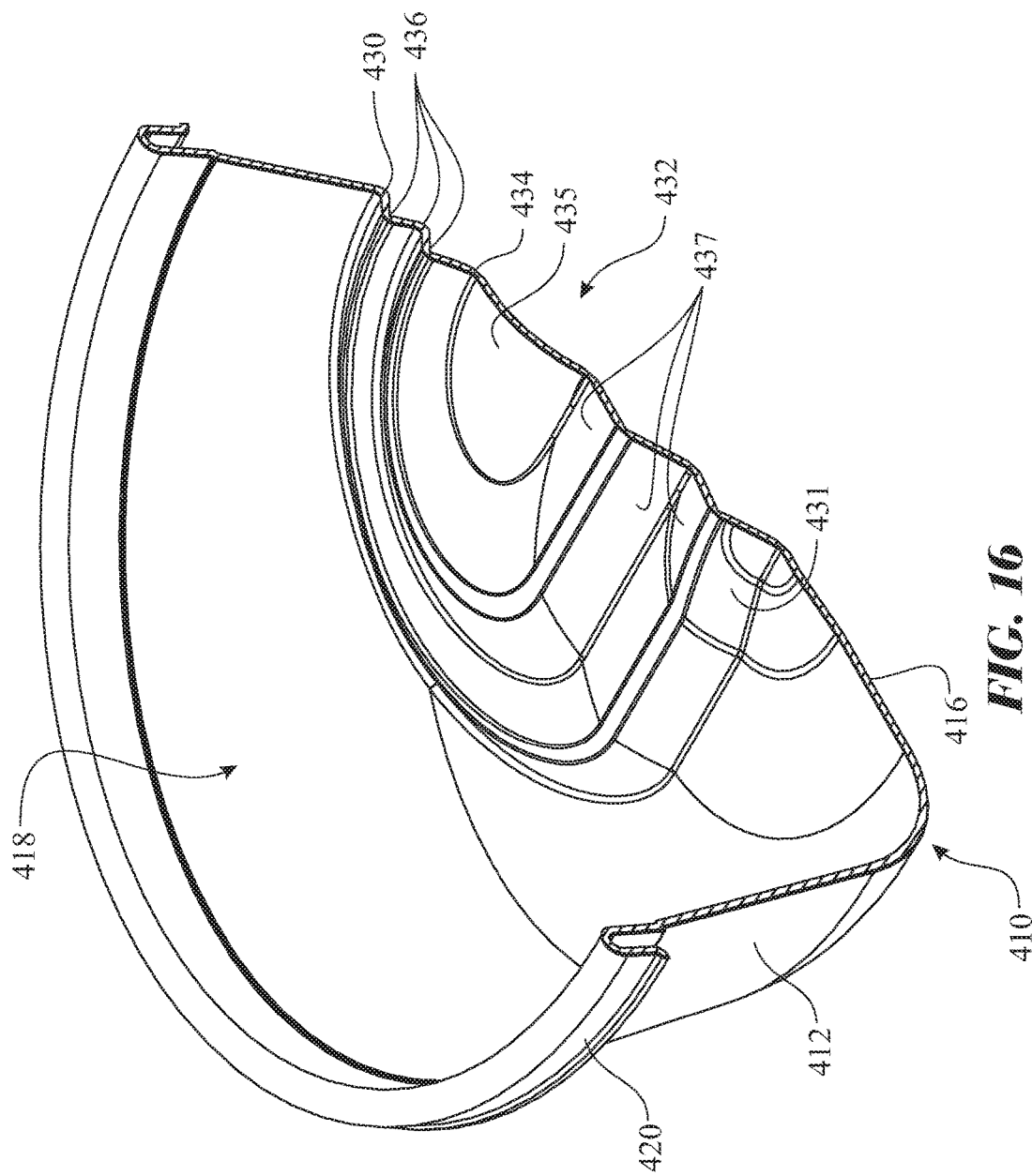
FIG. 16 presents a sectioned isometric side view of the enhanced version of the convertible carry out bowl originally introduced in FIG. 11, wherein the illustration presents the convertible carry out bowl in the collapsed, serving configuration following removal of the container lid.
Figure 17:
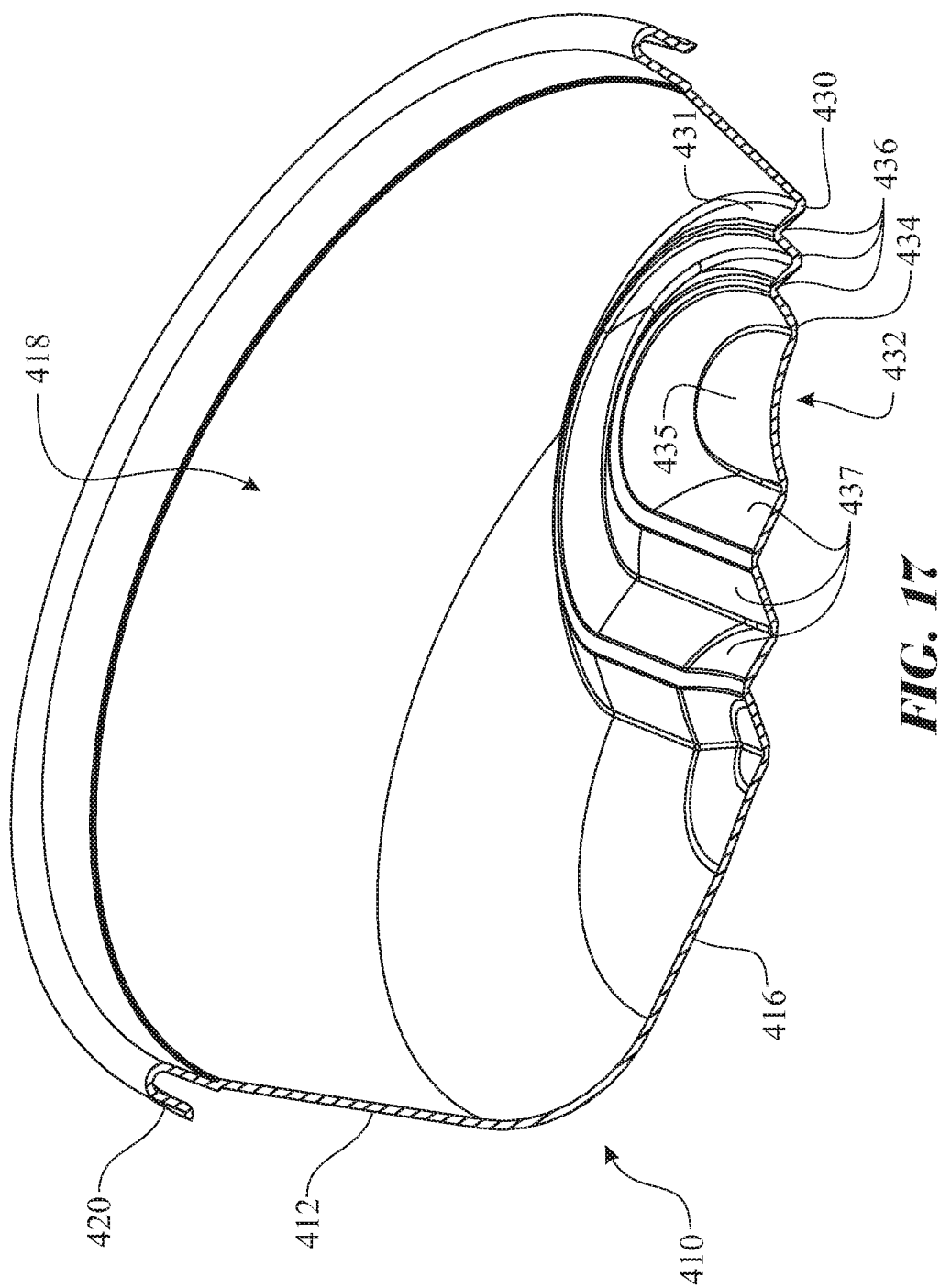
FIG. 17 presents a sectioned isometric side view of the enhanced version of the convertible carry out bowl originally introduced in FIG. 11, wherein the illustration presents the convertible carry out bowl in the collapsed, being rotated into a serving orientation with the collapsed section becoming the bottom, supporting surface of the carry out container.

A convertible container assembly 400 is an enhanced version of the convertible bowl or container assembly 100 and/or convertible bowl or container assembly 200, as illustrated in FIGS. 11 through 18. The convertible container assembly 400 is similar to the convertible bowl or container assembly 100 and/or the convertible bowl or container assembly 200, with the introduction of an accordion styled conversion section. Like features of the convertible container assembly 400 and convertible bowl or container assembly 100, 200 are numbered the same except preceded by the numeral '4'. A conversion section 432 is formed within a convertible container 410 of the convertible container assembly 400. The conversion section 432 enables conversion of the convertible container 410 from a carry out configuration, where the conversion section 432 is extended outward and a serving configuration (as best shown in FIG. 14), where the conversion section 432 is collapsed inward forming an accordion shape (as best shown in FIGS. 15 through 18).

Figure 18:
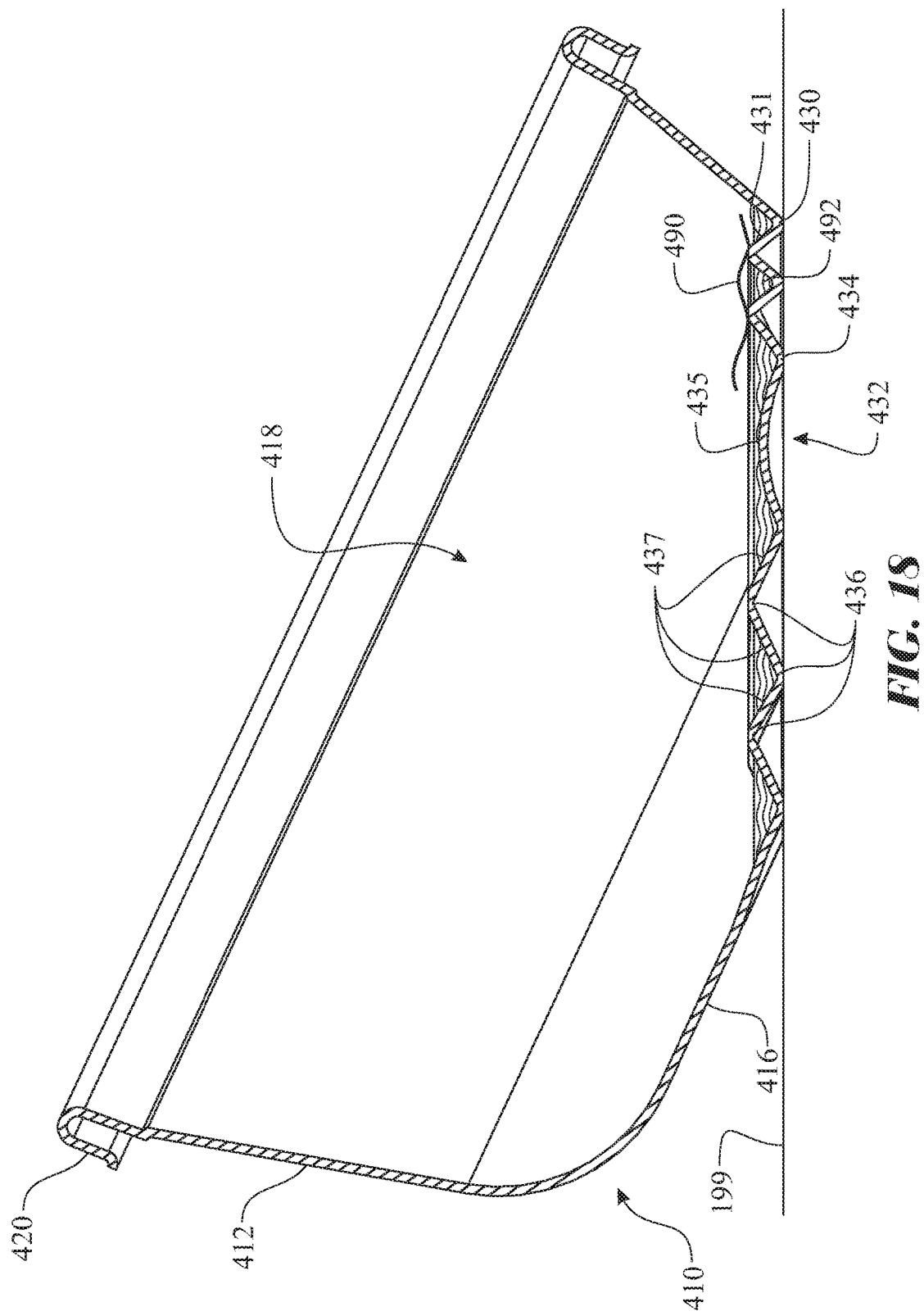
FIG. 18 presents a sectioned isometric side view of the enhanced version of the convertible carry out bowl originally introduced in FIG. 11, wherein the illustration presents the convertible carry out bowl in the collapsed, being rotated into a serving orientation with the collapsed section becoming the bottom, supporting surface of the carry out container.

The conversion section 432 includes a series of segments enabling the section to collapse in an accordion fashion. In the exemplary embodiment, the conversion section 432 is bound by or defined externally by a primary conversion demarcation 430. A portion of the primary conversion demarcation 430 extends across a portion of a concave shaped container shell sidewall 412 of the convertible container 410 and a second portion of the primary conversion demarcation 430 extends across a portion of a container bottom portion 416 of the convertible container 410. The primary conversion demarcation 430 preferably defines an outer resting area for the convertible container 410 when the conversion section 432 is collapsed into the serving configuration. The conversion section 432 would be shaped to offset the center of gravity of the convertible container 410 to stably maintain the convertible container 410 in a desired serving position (as shown in FIG. 18) during use.

The conversion section 432 includes a series of offset semi-circular segments, more specifically, a outer conversion segment 431 extending as an annular shaped segment between a primary conversion demarcation 430 and a first intermediary demarcation 436, a series of intermediary conversion segments 437 extending between adjacent intermediary demarcations 436 (with an interior intermediary conversion segment 437 extending between one intermediary conversion segment 437 and an adjacent inner conversion demarcation 434, and a inner conversion segment 435 defined within an interior of the inner conversion demarcation 434.

In use, the convertible container 410 would initially be configured having the conversion section 432 extended outward, placing the convertible container 410 into a carry out configuration. Contents, such as a serving of food, leftovers, and the like, would be placed into the convertible container 410. A bowl cover 440 would be secured to the convertible container 410 engaging a rim attachment feature 450 of the bowl cover 440 with a cover attachment interface 420 of the convertible container 410. The bowl cover 440 can include a condiment container receptacle 448 or any other suitable condiment storage feature. It is understood that any of the above described condiment storage and/or serving features can be incorporated into the bowl cover 440.

If desired, the user can transfer a condiment, such as a salad dressing, into the container content receiving section 418. The user would reseal any opening and shake the container to mix the condiment with the other contents residing within the container content receiving section 418.

The demarcations 430, 434, 436 can be designed to direct the folding between conversion segments 431, 435, 437 in a desired direction such as to form the exemplary accordion shape best shown FIG. 18. The demarcations 430, 434, 436 can be of two alternating designs, as shown. The demarcations 430, 434, 436 can be formed as interior favored demarcation(s) 460 and exterior favored demarcation(s) 462. Each interior favored demarcation 460 would favor a fold forming an acute angle on an interior of the convertible container 410. Each exterior favored demarcation 462 would favor a fold forming an obtuse angle on the interior of the convertible container 410. The interior favored demarcation 460 can be formed having material removed from an interior surface of the convertible container 410. The exterior favored demarcation 462 can be formed having material removed from an exterior surface of the convertible container 410. The exemplary demarcations can be formed using a thermal vacuum forming process. The depth of each demarcation can control a remaining thickness of the material of the convertible container 410 in each respective demarcation. The greater the depth, the thinner the remaining material. The changes in thickness can be one feature used to control the order of the folding of the conversion segments 431, 435, 437. The thinner the demarcation, the quicker the demarcation reacts to the folding process. In one embodiment, the convertible container 410 can be designed to cause the inner conversion segment 435 to recess first, then each of the intermediary conversion segment 437, and ending with the folding of the outer conversion segment 431. In a second embodiment, the convertible container 410 can be designed to cause the outer conversion segment 431 to recess first, then each of the intermediary conversion segment 437, and ending with the folding of the inner conversion segment 435. The exemplary fold direction controlling demarcations 460, 462 are formed having a "U" or "V" cross sectional shape. It is understood that the fold direction controlling demarcations 460, 462 can be formed using a stamping process, a heat stamping process, included in a molding process or using any other suitable forming process.

Prior to serving, the user would apply a compression force to the conversion section 432 (preferably to the inner conversion segment 435), causing the conversion section 432 to collapse inward in accordance with the preformed demarcations 430, 434, 436. The segments would transition from an extended configuration (as shown in FIG. 14) into an accordion configuration (as shown in FIGS. 15 through 18). The user would remove the bowl cover 440 from the convertible container 410 either prior to or preferably after reconfiguring the conversion section 432. The user would place the collapsed section of the conversion section 432 of the convertible container 410 upon a support surface 499, tiling the convertible container 410 as shown in FIG. 18, and begin consuming the contents therefrom.

The accordion formation at the base of the convertible container 410 can elevate food 490, such as lettuce, above liquids 492, such as salad dressing.

Although the exemplary embodiment is formed having a series of offset semi-circular demarcations 430, 434, 436, it is understood that any suitable shape can be used to provide a collapsible section 432. The conversion section 432 can comprise a series of generally linearly shaped segments, triangular shaped segments, trapezoidally shaped segments, arched segments, pentagonally shaped segments, hexagonally shaped segments, octagonally shaped segments, and the like.

It is understood that the same concept can be applied to home ware, wherein the convertible container base 510, shown in FIGS. 19 through 22, can be configured in a storage configuration for storing contents and converted into a serving configuration for serving contents. The convertible container assembly 510 is similar to the convertible bowl or container assembly 410 and/or the convertible bowl or container assembly 210, with the introduction of a depth conversion section 582. Like features of the convertible container 510 and convertible bowl or container 410 are numbered the same except preceded by the numeral '5'.

The convertible container 110, 210, 410 510, can additionally include a second series of demarcations defining a depth conversion section 582, wherein the depth conversion section 582 would be similar to the angular conversion series of convertible demarcations 432, but oriented being parallel to at least one of the convertible container bottom surface 116, 216, 416, 516 or the upper opening rim 114, 214, 414, 514. When compressed, the second series of convertible demarcations 582 are collapsed, the convertible container base 110, 210, 410 is collapsed into a storage or portable configuration having a reduced volume. When expanded, the second series of convertible demarcations 582 reformed returning the convertible container base 510 into a container configuration having a container content receiving section 518.

Figure 19:
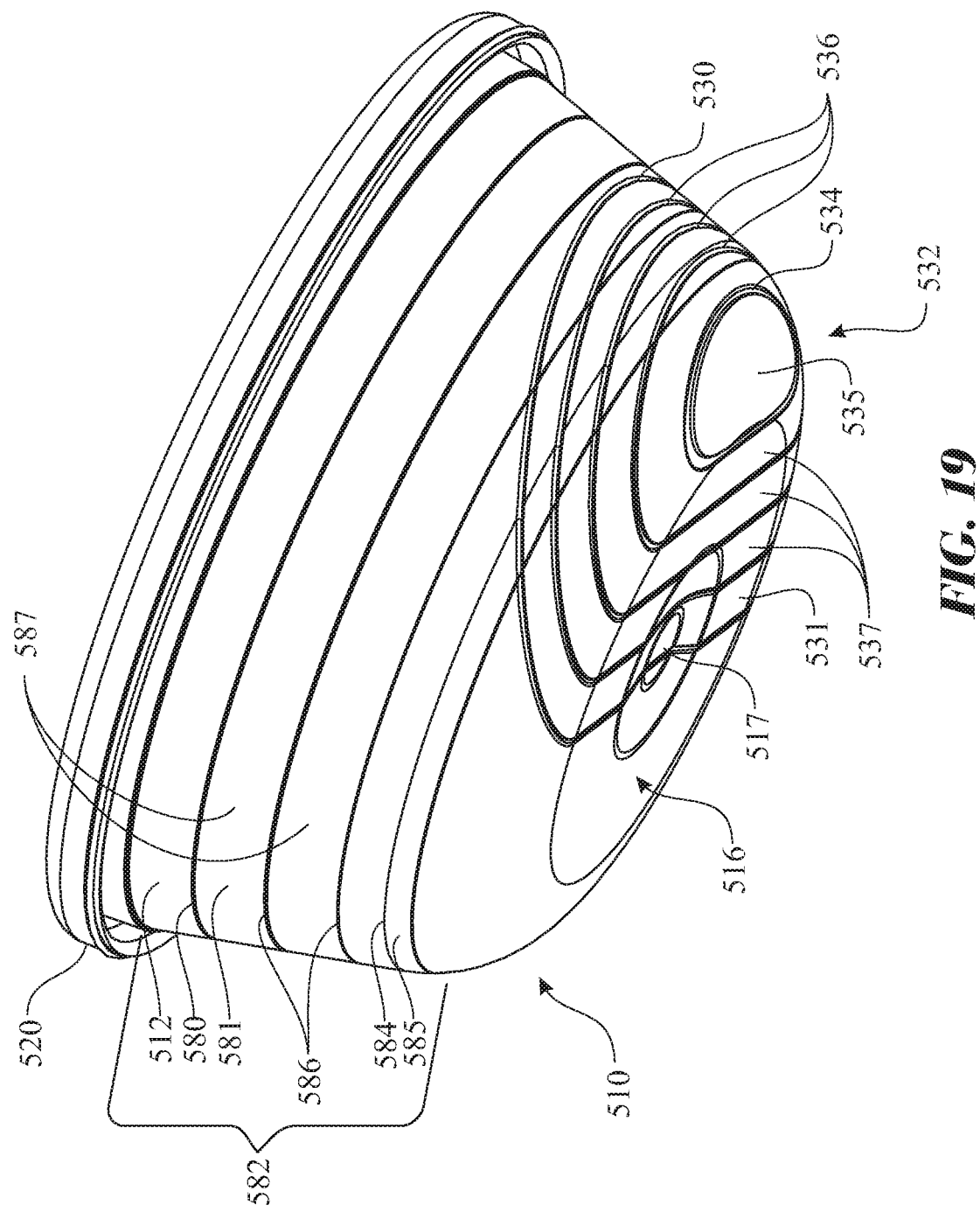
FIG. 19 presents a bottom, elevation isometric view of a further enhanced version of the convertible bowl, wherein the enhancement introduces an accordion expansion and collapsing design to increase and decrease an overall height of the convertible bowl body, the illustration presenting the convertible bowl in an expanded bowl configuration having a maximum height for use as a bowl.
Figure 20:
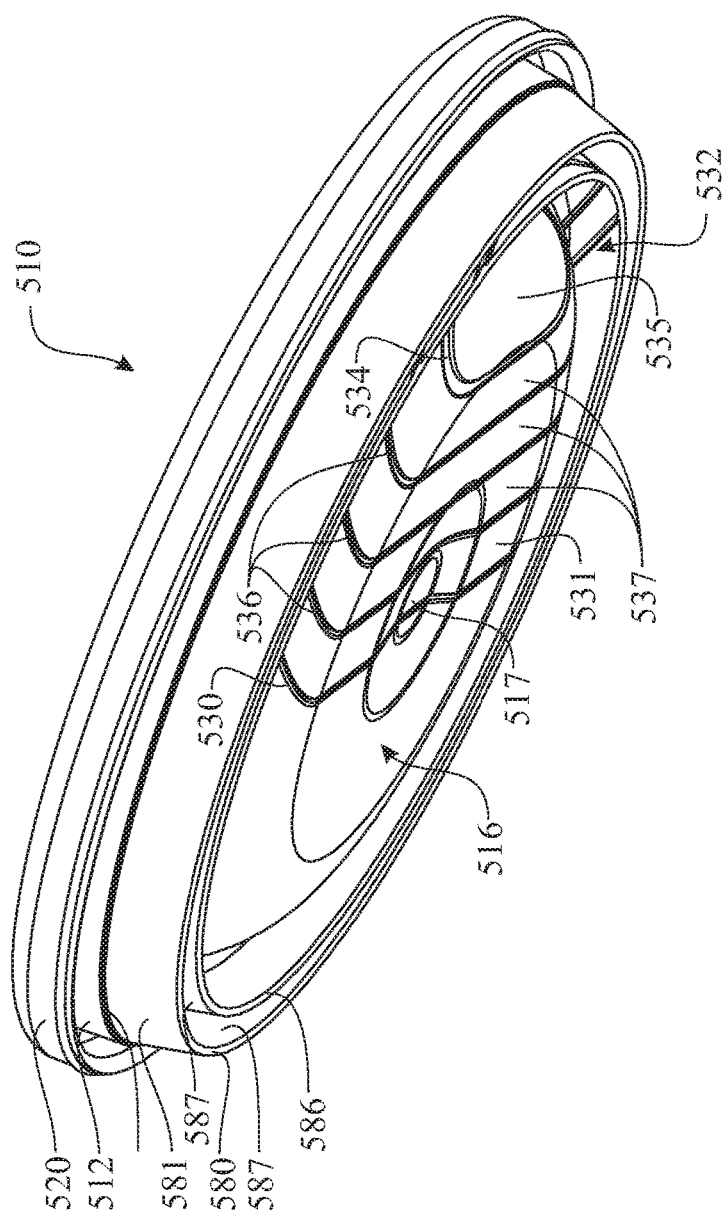
FIG. 20 presents a bottom, elevation isometric view of the further enhanced version of the convertible bowl originally introduced in FIG. 19, the illustration presenting the convertible bowl in a collapsed bowl configuration having a minimum height for storage.
Figure 21:
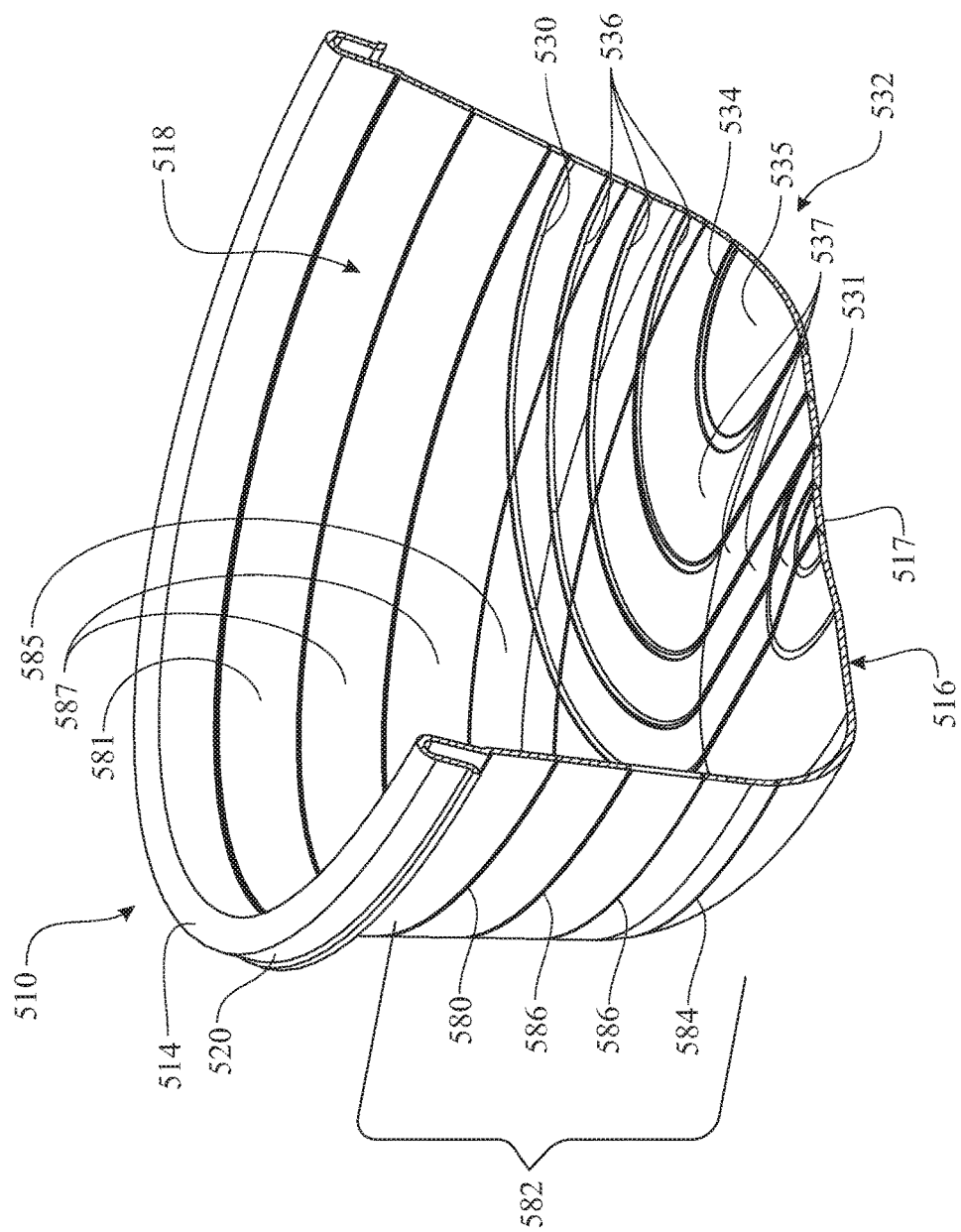
FIG. 21 presents a sectioned bottom, elevation isometric view of the further enhanced version of the convertible bowl as originally presented in an expanded configuration illustrated in FIG. 19, the section being taken along an elevation plane through a central region of the convertible bowl.
Figure 22:
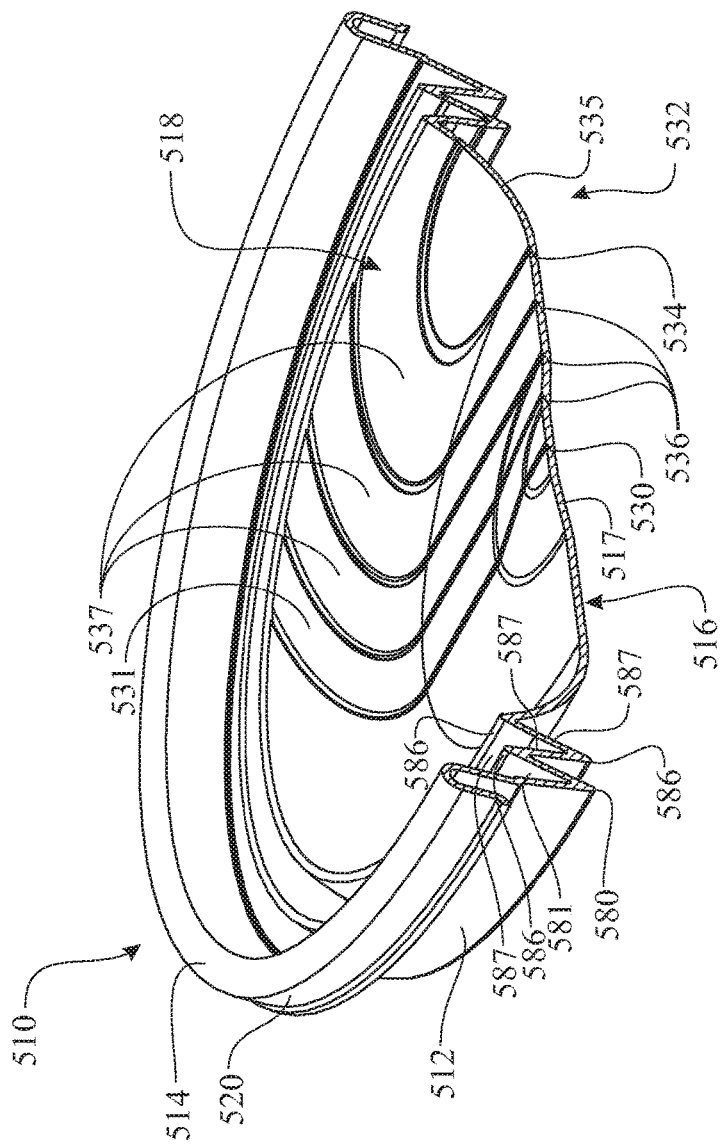
FIG. 22 presents a sectioned bottom, elevation isometric view of the further enhanced version of the convertible bowl as originally presented in a collapsed configuration illustrated in FIG. 20, the section being taken along an elevation plane through a central region of the convertible bowl.

In more detail, the second series of demarcations 582 are similar to the angular conversion section 532, including a series of demarcations 580, 584, 586 and association adjacent conversion segments 581, 585, 587. An upper depth conversion demarcation 580 is formed proximate the cover attachment interface 520 of the convertible container 510. A lower depth conversion demarcation 584 is formed proximate the container bottom portion 516 of the convertible container 510. A plurality of intermediary demarcations 586 are formed being spatially arranged between the upper depth conversion demarcation 580 and the lower depth conversion demarcation 584. An upper depth conversion segment 581 is located between the upper depth conversion demarcation 580 and the adjacent intermediary demarcation 586. An intermediary conversion segment 537 is located between pairs of adjacently located intermediary demarcations 586. A lower depth conversion segment 585 is defined by the lower depth conversion demarcation 584, wherein the lower depth conversion segment 585 includes the container bottom portion 516 of the convertible container 510. The depth conversion section 582 converts the convertible container 510 from a contents containing configuration, as shown in FIGS. 19 and 21 to a storage configuration, shown in FIGS. 20 and 22 and back. The conversion from the contents containing configuration to the storage configuration is accomplished by compressing the upper opening rim 514 and the container bottom portion 516 towards one another, collapsing the depth conversion section 582. The conversion from the storage configuration to the contents containing configuration to accomplished by pressing the container bottom portion 516 away from the upper opening rim 514, expanding the depth conversion section 582. The demarcations 580, 584, 586 can be formed in any suitable configuration. The demarcations 580, 584, 586 can be formed in at least one of extending inward from an exterior surface of the body of the convertible container body 510, extending inward from an interior surface of the body of the convertible container body 510, and as a necked down configuration formed within the sidewall of the convertible container body 510.

Although the disclosed exemplary embodiments are provided in a form factor of a bowl, it is understood that the same concept can be applied to containers having other shapes, including square, rectangular, hexagonal, octagonal, oblong, oval, and the like.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

ELEMENT DESCRIPTION REFERENCES

Ref No. Description
100 convertible bowl assembly
110 convertible bowl
112 concave shaped shell sidewall
114 upper opening rim
116 bowl bottom portion
117 bottom recession
118 bowl content receiving section
120 cover attachment interface
130 conversion demarcation
132 conversion section
140 bowl cover
142 cover section
143 cover upper surface
144 recessed cover section
146 container retention mating feature
148 condiment container receptacle
150 rim attachment feature
152 rim receiving interface
154 removal assisting lip
160 condiment container assembly
162 condiment container
166 condiment container retention feature
168 condiment container contents receptacle
169 condiment container cover
199 support surface
200 convertible bowl assembly
210 convertible bowl
212 concave shaped shell sidewall 214 upper opening rim
215 stacking base interface
216 bowl bottom portion
217 bottom recession
218 bowl content receiving section
220 cover attachment interface
230 conversion demarcation
232 conversion section
240 bowl cover
242 cover section
243 cover upper surface
244 recessed cover section
245 stacking cover interface
246 container retention mating feature
248 condiment container receptacle
250 rim attachment feature
252 rim receiving interface
254 removal assisting lip
260 condiment container assembly
262 condiment container
266 condiment container retention feature
268 condiment container contents receptacle
269 condiment container cover
340 bowl cover
342 cover section
343 cover upper surface
344 recessed cover section
345 stacking cover interface
346 container retention mating feature
348 condiment container receptacle
350 rim attachment feature
352 rim receiving interface
354 removal assisting lip
360 condiment container assembly
362 condiment container
366 condiment container retention feature
368 condiment container contents receptacle
369 condiment container cover
370 condiment container
372 condiment sidewall
374 condiment container base
376 dispensing grooves
378 lid coupling rim
400 convertible container assembly
410 convertible container
412 concave shaped container shell sidewall
414 upper opening rim
416 container bottom portion
417 bottom recession
418 container content receiving section
420 cover attachment interface
430 primary conversion demarcation
431 outer conversion segment
432 conversion section
434 inner conversion demarcation
435 inner conversion segment
436 intermediary demarcation
437 intermediary conversion segment
440 bowl cover
442 cover section
444 recessed cover section
448 condiment container receptacle
450 rim attachment feature
460 interior favored demarcation
462 exterior favored demarcation
490 food
492 liquid
499 support surface
510 convertible container
512 concave shaped container shell sidewall
514 upper opening rim
516 container bottom portion
517 bottom recession
518 container content receiving section
520 cover attachment interface
530 primary angular conversion demarcation
531 outer angular conversion segment
532 angular conversion section
534 inner angular conversion demarcation
535 inner angular conversion segment
536 intermediary angular demarcation
537 intermediary angular conversion segment
580 upper depth conversion demarcation
581 upper depth conversion segment
582 depth conversion section
584 lower depth conversion demarcation
585 lower depth conversion segment
586 intermediary depth demarcation
587 intermediary depth conversion segment

What is claimed is:

1. A convertible container, comprising:
 a convertible container body, said convertible container having a bottom surface, a planar support surface integral with said bottom surface, and a container sidewall extending upwardly from a peripheral edge of said bottom surface, said bottom surface and said container sidewall collectively defining a content receiving section, wherein an upper edge of said container sidewall forming an upper opening rim circumscribing and defining an opening of said content receiving section, said upper rim is substantially parallel to said support surface and defining a stacking plane, and
 a plurality of angular conversion demarcations, each angular conversion demarcation of said series of angular conversion demarcations being a flexible formation that segments said convertible container body defining a depressible angular conversion section, an outermost angular conversion demarcation of said series of angular conversion demarcations substantially defining a plane angularly disposed from said bottom surface and encompassing a combined portion of said support surface and said container sidewall, one demarcation of the series of angular conversion demarcations is formed having a first cross sectional demarcation configuration and a different demarcation of the series of angular conversion demarcations is formed having a second cross sectional demarcation configuration, wherein the first cross sectional demarcation configuration and the second cross sectional demarcation configuration are different from one another,
 wherein, in a fill configuration, said depressible angular conversion section is extended outward, away from said content receiving section of said convertible container body having said convertible container body resting on said planar support surface and in a consumption configuration, said depressible angular conversion section is depressed inward, towards said content receiving section of said convertible container body having said convertible container body resting on said angular conversion demarcation.

2. The convertible container as recited in claim 1, wherein said demarcations having said first cross sectional demarcation configuration and said different demarcations having said second cross sectional demarcation configuration are arranged alternating from one another.

3. The convertible container as recited in claim 1, wherein said series of demarcations are arranged having at least one demarcation of said series of demarcations in a non-concentric configuration with a second demarcation of said series of demarcations.

4. The convertible container as recited in claim 1, further comprising a depth conversion section, wherein said depth conversion section includes at least one depth conversion demarcation, said at least one depth conversion demarcation being a flexible formation that circumscribes said convertible container body, said at least one depth conversion demarcation substantially defining a plane being substantially parallel to said bottom surface, wherein, in a container configuration, said depressible depth conversion section is extended outward, away from said content receiving section of said convertible container body and in a storage configuration, said depressible depth conversion section is depressed inward, towards said content receiving section of said convertible container body positioning a plane defined by said planar support surface proximate a plane defined by said upper opening rim.

5. The convertible container as recited in claim 1, wherein when said depressible angular conversion section is depressed inward, said series of angular conversion demarcations form an accordion shaped convertible container support surface.

6. The convertible container as recited in claim 1, wherein at least one angular conversion demarcation of said series of angular conversion demarcations is offset from at least another angular conversion demarcation of said series of angular conversion demarcations.

7. The convertible container as recited in claim 1, wherein at least one angular conversion demarcation of said series of angular conversion demarcations is concentric with at least another angular conversion demarcation of said series of angular conversion demarcations.

8. The convertible container as recited in claim 1, wherein said depressible angular conversion section would be shaped to offset a center of gravity of said convertible container to stably maintain said convertible container in a desired serving position during use.

9. A convertible container, comprising:

a convertible container body, said convertible container body having a bottom surface, a planar support surface integral with said bottom surface, and a container sidewall extending upwardly from a peripheral edge of said bottom surface, said bottom surface and said container sidewall collectively defining a content receiving section, wherein an upper edge of said container sidewall forming an upper rim circumscribing and defining an opening of said content receiving section, said upper rim is substantially parallel to said support surface and defining a stacking plane; and a series of angular conversion demarcations, each angular conversion demarcation of said series of angular conversion demarcations being a flexible formation that segments said concave shell defining a depressible angular conversion section, an outermost angular conversion demarcation of said series of angular conversion demarcations substantially defining a plane angularly disposed from said bottom surface and encompassing a combined portion of said support surface and said container sidewall, one demarcation of the series of angular conversion demarcations is formed having a first cross sectional demarcation configuration and a different demarcation of the series of angular conversion demarcations is formed having a second cross sectional demarcation configuration, wherein the first cross sectional demarcation configuration and the second cross sectional demarcation configuration are different from one another, a depth conversion section, wherein said depth conversion section includes at least one depth conversion demarcation, said at least one depth conversion demarcation being a flexible formation that circumscribes said convertible container body, said at least one depth conversion demarcation substantially defining a plane being substantially parallel to said bottom surface, wherein, in a fill configuration, said depressible angular conversion section is extended outward, away from said content receiving section of said convertible container having said convertible container resting on said planar support surface and in a consumption configuration, said depressible angular conversion section is depressed inward, towards said content receiving section of said convertible container having said convertible container resting on said angular conversion demarcation, wherein, in a container configuration, said depressible depth conversion section is extended outward, away from said content receiving section of said convertible container body and in a storage configuration, said depressible depth conversion section is depressed inward, towards said content receiving section of said convertible container body positioning a plane defined by said planar support surface proximate a plane defined by said upper opening rim.

10. The convertible container as recited in claim 9, said demarcations having said first cross sectional demarcation configuration and said different demarcations having said second cross sectional demarcation configuration are arranged alternating from one another.

11. The convertible container as recited in claim 9, wherein said series of demarcations are arranged having at least one demarcation of said series of demarcations in a non-concentric configuration with a second demarcation of said series of demarcations.

12. The convertible container as recited in claim 9, wherein when said depressible angular conversion section is depressed inward, said series of angular conversion demarcations form an accordion shaped convertible container support surface.

13. The convertible container as recited in claim 9, wherein at least one angular conversion demarcation of said series of conversion demarcations is offset from at least another conversion demarcation of said series of conversion demarcations.

14. The convertible container as recited in claim 9, wherein at least one angular conversion demarcation of said series of angular conversion demarcations is concentric with at least another angular conversion demarcation of said series of angular conversion demarcations.

15. The convertible container as recited in claim 9, wherein said an apex of said angular conversion demarcation is oriented towards said content receiving section of said convertible container.

16. The convertible container as recited in claim 9, wherein at least one demarcation of the at least one angular conversion demarcation and the at least one depth conversion demarcation is formed in accordance with at least one of the following formations:

extending inward from an exterior surface of said convertible container body,
extending inward from an interior surface of said convertible container body, and
a necked down configuration formed within said sidewall of the convertible container body.

17. A method of serving contents from within a convertible container, comprising steps of:
obtaining said convertible container, said convertible container including:
a concave shell, said concave shell having a bottom surface, a planar support surface integral with said bottom surface, and a convertible container sidewall extending upwardly from a peripheral edge of said bottom surface, said bottom surface and said convertible container sidewall collectively defining a content receiving section, wherein an upper edge of said convertible container sidewall forming an upper rim circumscribing and defining an opening of said content receiving section,
at least one a series of angular conversion demarcations, each angular conversion demarcation of said series of said angular conversion demarcations being a flexible formation that segments said concave shell defining a depressible angular conversion section, an outermost angular conversion demarcation of said series of angular conversion demarcations substantially defining a plane angularly disposed from said bottom surface and encompassing a combined portion of said support surface and said convertible container sidewall, one demarcation of the plurality of angular conversion demarcations is formed having a first cross sectional demarcation configuration and a different demarcation of the plurality of angular conversion demarcations is formed having a second cross sectional demarcation configuration, wherein the first cross sectional demarcation configuration and the second cross sectional demarcation configuration are different from one another, and
a depth conversion section, wherein said depth conversion section includes at least one depth conversion demarcation, said at least one depth conversion demarcation being a flexible formation that circumscribes said convertible container body, said at least one depth conversion demarcation substantially defining a plane being substantially parallel to said bottom surface,
wherein, in a fill configuration, said depressible angular conversion section is extended outward, away from said content receiving section of said convertible container having said convertible container resting on said planar support surface and in a consumption configuration, said depressible angular conversion section is depressed inward, towards said content receiving section of said convertible container having said convertible container resting on said conversion demarcation,
wherein, in a container configuration, said depressible depth conversion section is extended outward, away from said content receiving section of said convertible container body and in a storage configuration, said depressible depth conversion section is depressed inward, towards said content receiving section of said convertible container body positioning a plane defined by said planar support surface proximate a plane defined by said upper opening rim;
extending said depressible depth conversion section outward, into said container configuration;
depositing content into said container content receiving section of said convertible container;
depressing a conversion section of said convertible container inward to create a support surface which positions an upper edge of said convertible container to a non-horizontal orientation;
placing said depressed angular conversion section of said convertible container upon a support surface;
extracting content from content receiving section of said convertible container; and
collapsing said depressible depth conversion section inward, converting said convertible container into said storage configuration.

18. The method of serving food within a convertible container as recited in claim 17, the method further comprising a step of:
depressing said series of angular conversion demarcations.

19. The method of serving food within a convertible container as recited in claim 17, the method further comprising steps of:
depressing said series of angular conversion demarcations; and
forming an accordion shaped bottom shaped convertible container support surface.

20. The method of serving food within a convertible container as recited in claim 19, the method further comprising a step of supporting content upon an upper, peak portion of said accordion shaped bottom shaped convertible container support surface and allowing a liquid to collect within a lower, valley section of said accordion shaped bottom shaped convertible container support surface.

* * * * *